(12) United States Patent
Zheng et al.

(10) Patent No.: US 12,529,040 B2
(45) Date of Patent: Jan. 20, 2026

(54) DNA POLYMERASE, APTAMER, WARM-START DNA POLYMERASE AND PREPARATION METHODS AND APPLICATION THEREOF

(71) Applicants: Sun Yat-Sen University, Guangzhou (CN); Shenzhen Qiyu Biotechnology Co., Ltd., Shenzhen (CN)

(72) Inventors: Kewei Zheng, Guangzhou (CN); Tingting Cai, Guangzhou (CN); Chenglin Wang, Shenzhen (CN); Huiting Liang, Guangzhou (CN)

(73) Assignee: SHENZHEN QIYU BIOTECHNOLOGY CO., LTD., Shenzhen (CN)

( * ) Notice: Subject to any disclaimer, the term of this patent is extended or adjusted under 35 U.S.C. 154(b) by 897 days.

(21) Appl. No.: 17/835,949

(22) Filed: Jun. 8, 2022

(65) Prior Publication Data
US 2023/0287363 A1    Sep. 14, 2023

Related U.S. Application Data

(63) Continuation-in-part of application No. PCT/CN2022/082834, filed on Mar. 24, 2022.

(30) Foreign Application Priority Data

Mar. 10, 2022 (CN) .......................... 202210233262.7

(51) Int. Cl.
*C12N 15/62* (2006.01)
*C07K 14/47* (2006.01)
*C12N 9/12* (2006.01)
*C12N 15/115* (2010.01)
*C12Q 1/68* (2018.01)
*C12Q 1/70* (2006.01)

(52) U.S. Cl.
CPC ........ *C12N 9/1252* (2013.01); *C07K 14/4703* (2013.01); *C12N 15/115* (2013.01); *C12N 15/62* (2013.01); *C12Q 1/708* (2013.01); *C12Y 207/07007* (2013.01)

(58) Field of Classification Search
None
See application file for complete search history.

(56) References Cited

U.S. PATENT DOCUMENTS 5,567,604 A * 10/1996 Rando .................... C07H 21/00
435/238

OTHER PUBLICATIONS

Roxo et al. G-Quadruplex-Forming Aptamers—Characteristics, Applications, and Perspectives. Molecules 2019, 24, 3781.*

* cited by examiner

*Primary Examiner* — Nianxiang Zou
(74) *Attorney, Agent, or Firm* — MATTHIAS SCHOLL P.C.; Matthias Scholl

(57) ABSTRACT

A modified DNA polymerase includes a DNA polymerase fragment and a G-quadruplex binding peptide fused to an N-terminal of the DNA polymerase fragment.

19 Claims, 25 Drawing Sheets

Specification includes a Sequence Listing.

DNA POLYMERASE, APTAMER, WARM-START DNA POLYMERASE AND PREPARATION METHODS AND APPLICATION THEREOF

CROSS-REFERENCE TO RELAYED APPLICATIONS

This application is a continuation-in-part of International Patent Application No. PCT/CN2022/082834 with an international filing date of Mar. 24, 2022, designating the United States, now pending, and further claims foreign priority benefits to Chinese Patent Application No. 202210233262.7 filed Mar. 10, 2022. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of biotechnology, and more particularly to a modified DNA polymerase, aptamer, warm-start DNA polymerase, a kit, a method for biosynthesizing the DNA polymerase, a method for preparing the warm-start DNA polymerase, and an application of the DNA polymerase in combination with the aptamer for detecting a nucleic acid or synthesizing a nucleic acid.

Nucleic acid amplification testing is widely used in studying human diseases and monitoring pathogens. Apart from PCR, numerous isothermal amplification technologies have been developed to amplify the detection signal of nucleic acids, such as loop-mediated isothermal amplification (LAMP), recombinase polymerase amplification (RPA), strand displacement amplification (SDA), and rolling circle amplification (RCA). These technologies had also been reported to detect the spreading severe acute respiratory syndrome coronavirus-2 (SARS-CoV-2).

A key challenge of nucleic acid detection technology is non-specific amplification caused by primer mismatch and non-template amplification. Non-specific amplification greatly impedes or reduces the amplification efficiency of the target, thus decreasing the sensitivity of detection. An effective way to avoid non-specific amplification is to block the activity of thermophilic DNA polymerase at low temperatures. In PCR reaction, blocking the activity of the DNA polymerase with an antibody or a specific aptamer is the most popular way to prevent non-specific amplification. Covalent modification of DNA polymerases (such as Tag DNA polymerase) is another way to block the activity of them. In addition, the introduction of specific mutation sites in the amino acids of the DNA polymerase will also change its properties and reduce the activity of the polymerases.

Compared with PCR, the non-specific amplification in isothermal amplification also exists and seriously affects the application of the related technologies, such as LAMP. However, there are few solutions that can solve the problem of non-specific amplification in isothermal amplification. It has been reported that amide additives improved the specificity of nucleic acid amplification and reduce the background amplifications in LAMP. But the addition of organic solvents also has many limitations, such as the preparation of lyophilized reagents. Helicase from *Thermoanaerobacter tengcongensis* has been found to inhibit the amplification of non-target nucleic acids, which effectively reduced the background signal. However, helicase hydrolyzes dATP and releases $H^+$, leading to the change in solution pH, which limits its application in a pH mediated colorimetric LAMP.

SUMMARY

To overcome the shortcomings of the prior art, a first object of the disclosure is to provide a modified DNA polymerase, which can provide a broad-spectrum technical strategy for preparing a warm-start DNA polymerase.

The modified DNA polymerase comprises a DNA polymerase fragment and a G-quadruplex binding peptide fused to an N-terminal of the DNA polymerase fragment.

A second object of the disclosure is to provide an aptamer for regulating the activity of the DNA polymerase.

The disclosure provides the aptamer for regulating the activity of the DNA polymerase; the nucleotide sequence of the aptamer comprises a G-quadruplex core sequence, and the secondary structure of the G-quadruplex core sequence is a G-quadruplex;

the G-quadruplex is configured to bind to the G-quadruplex binding peptide of the DNA polymerase at a first preset temperature to inhibit the activity of the DNA polymerase, and configured to detach from the G-quadruplex binding peptide of the DNA polymerase at a second preset temperature, to restore the activity of the DNA polymerase; the second preset temperature is higher than the first preset temperature.

A third object of the disclosure is to provide a warm-start DNA polymerase.

The warm-start DNA polymerase comprises the DNA polymerase and the aptamer; the G-quadruplex of the aptamer binds to the G-quadruplex binding peptide of the DNA polymerase at the first preset temperature to inhibit the activity of the DNA polymerase, and detaches from the G-quadruplex binding peptide of the DNA polymerase at the second preset temperature to restore the activity of the DNA polymerase; the second preset temperature is higher than the first preset temperature.

A fourth object of the disclosure is to provide a kit.

The kit comprises the DNA polymerase and the aptamer.

A fifth object of the disclosure is to provide a method for biosynthesizing the DNA polymerase.

The method for biosynthesizing the DNA polymerase comprises the following steps:
  inserting the DNA polymerase fragment into a plasmid vector to construct a first plasmid;
  inserting the coding sequence of the G-quadruplex binding peptide into N-terminal of the DNA polymerase fragment of the first plasmid, to construct a second plasmid;
  transforming the second plasmid into an *E. coli* strain for culturing and inducing expression of a protein; and
  purifying the protein to obtain the DNA polymerase.

A sixth object of the disclosure is to provide a method for preparing a warm-start DNA polymerase.

The warm-start DNA polymerase comprises the DNA polymerase and the aptamer, and the aptamer binds to the G-quadruplex binding peptide through the G-quadruplex to bind to the DNA polymerase, and the method comprises the following steps:
  dissolving the aptamer in a first buffer, denaturing at 90° C.-100° C. for 2 min to 8 min, cooling to 20° C.-30° C. to obtain the treated aptamer; and
  adding the DNA polymerase and the treated aptamer to a second buffer at a preset molar concentration ratio, and incubating at 2° C.-6° C. for 30 min to 60 min;

the first buffer comprises 10 mM Tris-HCl (pH 7.4), 75 mM KCl, 0.5 mM EDTA and 0.2 mg/ml bovine serum albumin, and the second buffer comprises 20 mM Tris-HCl (pH 8.8), 10 mM $(NH_4)_2SO_4$, 50 mM KCl, 2-8 mM $MgSO_4$, and 0.1% Tween-20.

The seventh object of the disclosure is to provide an application of the DNA polymerase in combination with the aptamer for detecting a nucleic acid or synthesizing a nucleic acid.

The DNA polymerase in combination with the aptamer is used for detecting a nucleic acid or synthesizing a nucleic acid.

Compared with the prior art, the following advantages are associated with the modified DNA polymerase, aptamer, warm-start DNA polymerase, and the kit of the disclosure: (1) The disclosure constructs a modified DNA polymerase and an aptamer that specifically binds to the DNA polymerase. The activity of the DNA polymerase is strictly inhibited by the bound aptamer at the low temperature stage, but the activity is completely recovered when heated to the reaction temperature; when the DNA polymerase is applied to isothermal amplification, non-specific amplification will not occur; therefore, it has great application value in molecular diagnosis; (2) The modified DNA polymerase constructed and the aptamer specifically binding to the DNA polymerase are used to successfully solve the problem of non-specific amplification of HPV DNA and SARS-CoV-2 RNA detected by LAMP; (3) The binding of G-quadruplex binding peptide to G-quadruplex aptamer provides a new approach for the development of a controllable DNA polymerase.

DETAILED DESCRIPTION

Figure 1A:
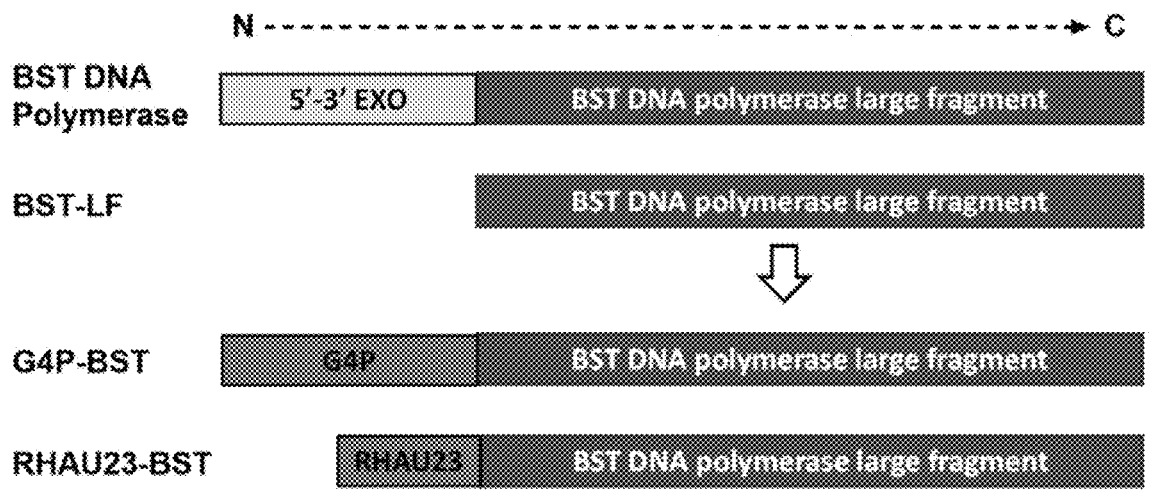
FIG. 1A is a structural representation of Bst DNA polymerase, Bst-LF and DNA polymerase provided by Example 1 of the disclosure, where the DNA polymerase is fused with G-quadruplex binding peptide, represented by G4P-Bst and RHAU23-Bst.

To further illustrate the disclosure, embodiments detailing a modified DNA polymerase, aptamer, warm-start DNA polymerase, a kit, a method for biosynthesizing the DNA polymerase, a method for preparing the warm-start DNA polymerase, and an application of the DNA polymerase in combination with the aptamer for detecting a nucleic acid or synthesizing a nucleic acid are described below. It should be noted that the following embodiments are intended to describe and not to limit the disclosure.

The disclosure provides a modified DNA polymerase, comprising a DNA polymerase fragment and a G-quadruplex binding peptide fused to the N-terminal of the DNA polymerase fragment.

As an embodiment, the G-quadruplex binding peptide is a RHAU23 peptide, and the amino acid sequence of the RHAU23 peptide is shown in SEQ ID NO: 1; or,
the G-quadruplex binding peptide is G4P, and the amino acid sequence of G4P is shown in SEQ ID NO: 2.

As an embodiment, the DNA polymerase fragment is resistant to temperatures above 40° C. and has activity at temperatures above 40° C.

As an embodiment, the DNA polymerase fragment is derived from any one of Bst DNA polymerase, Taq DNA polymerase and MMLV reverse transcriptase.

As an embodiment, the DNA polymerase fragment is derived from Bst DNA polymerase, and the amino acid sequence of the DNA polymerase fragment is shown in SEQ ID NO: 3.

As an embodiment, the DNA polymerase fragment is derived from Taq DNA polymerase, and the amino acid sequence of the DNA polymerase fragment is shown in SEQ ID NO: 4.

As an embodiment, the DNA polymerase fragment is derived from MMLV reverse transcriptase, and the amino acid sequence of the DNA polymerase fragment is shown in SEQ ID NO: 5.

The disclosure also provides an aptamer for regulating the activity of the DNA polymerase; the nucleotide sequence of the aptamer comprises a G-quadruplex core sequence, and the secondary structure of the G-quadruplex core sequence is a G-quadruplex;
the G-quadruplex is configured to bind to the G-quadruplex binding peptide of the DNA polymerase at a first preset temperature to inhibit the activity of the DNA polymerase, and configured to detach from the G-quadruplex binding peptide of the DNA polymerase at a second preset temperature, to restore the activity of the DNA polymerase; the second preset temperature is higher than the first preset temperature.

As an embodiment, the G-quadruplex is any one of a regular three-layered G-quadruplex, a bulged G-quadruplex, a G-vacancy bearing G-quadruplex, and a regular two-layered G-quadruplex.

As an embodiment, the nucleotide sequence of the aptamer further comprises a flanking DNA sequence at the 5'-end and/or 3'-end of the G-quadruplex core sequence.

As an embodiment, the flanking DNA sequence is a flanking single-stranded DNA sequence or a flanking double-stranded DNA sequence or a DNA sequence for forming a hairpin structure.

As an embodiment, the flanking DNA sequence is preferably a DNA sequence for forming a hairpin structure, and the length of the formed hairpin structure is greater than or equal to 7 bp.

As an embodiment, the first preset temperature is 0° C.-30° C., and the second preset temperature is 45° C.-70° C.

As an embodiment, the second preset temperature is 55° C.-65° C.

As an embodiment, the G-quadruplex core sequence is a CSTB core sequence, and the nucleotide sequence of the CSTB core sequence is shown in SEQ ID NO: 6; or,
the G-quadruplex core sequence is a KIT-C core sequence, and the nucleotide sequence of the KIT-C core sequence is shown in SEQ ID NO: 7; or,
the G-quadruplex core sequence is a T4B1 core sequence, and the nucleotide sequence of the T4B1 core sequence is shown in SEQ ID NO: 8; or,
the core sequence of G-quadruplex is a PDGFRB core sequence, and the nucleotide sequence of the PDGFRB core sequence is shown in SEQ ID NO: 9; or,
the G-quadruplex core sequence is a T1B1 core sequence, and the nucleotide sequence of the T1B1 core sequence is shown in SEQ ID NO: 10; or,
the G-quadruplex core sequence is a GVBQ1 core sequence, and the nucleotide sequence of the GVBQ1 core sequence is shown in SEQ ID NO: 11; or,
the G-quadruplex core sequence is a GVBQ2 core sequence, and the nucleotide sequence of the GVBQ2 core sequence is shown in SEQ ID NO: 12; or,
the G-quadruplex core sequence is a G12 core sequence, and the nucleotide sequence of the G12 core sequence is shown in SEQ ID NO: 13.

The disclosure also provides a warm-start DNA polymerase, comprising the DNA polymerase and the aptamer; the G-quadruplex of the aptamer binds to the G-quadruplex binding peptide of the DNA polymerase at the first preset temperature to inhibit the activity of the DNA polymerase, and detaches from the G-quadruplex binding peptide of the DNA polymerase at the second preset temperature to restore the activity of the DNA polymerase; the second preset temperature is higher than the first preset temperature.

As an embodiment, the first preset temperature is 0° C.-30° C., and the second preset temperature is 45° C.-70° C.

The disclosure also provides a kit comprising the DNA polymerase and the aptamer.

As an embodiment, the kit is used to detect human papilloma virus DNA or SARS-2-Cov virus RNA.

The disclosure also provides a method for biosynthesizing the DNA polymerase, comprising the following steps:
inserting the DNA polymerase fragment into a plasmid vector to construct a first plasmid;

inserting the coding sequence of the G-quadruplex binding peptide into N-terminal of the DNA polymerase fragment of the first plasmid, to construct a second plasmid;

transforming the second plasmid into an *E. coli* strain for culturing and inducing expression of a protein; and purifying the protein to obtain the DNA polymerase.

As an embodiment, the DNA polymerase fragment is derived from residues 291-878 of DNA polymerase of *Bacillus stearothermophilus*, the plasmid vector is pCold-I, and the first plasmid is pCold-I-Bst-LF plasmid; and the G-quadruplex binding peptide is G4P, and the second plasmid is pCold-I-G4P-Bst plasmid; or, the G-quadruplex binding peptide is RHAU23, and the second plasmid is pCold-I-RHAU23-Bst plasmid.

As an embodiment, the DNA polymerase fragment is derived from Taq DNA polymerase, the plasmid vector is pCold-I, and the first plasmid is pCold-I-Taq plasmid; and the G-quadruplex binding peptide is G4P, and the second plasmid is pCold-I-G4P-Taq plasmid; or, the G-quadruplex binding peptide is RHAU23, and the second plasmid is pCold-I-RHAU23-Taq plasmid.

As an embodiment, the DNA polymerase fragment is derived from MMLV reverse transcriptase, the plasmid vector is pCold-I, and the first plasmid is pCold-I-RT plasmid; and the G-quadruplex binding peptide is G4P, and the second plasmid is pCold-I-G4P-RT plasmid; or, the G-quadruplex binding peptide is RHAU23, and the second plasmid is pCold-I-RHAU23-RT plasmid.

The disclosure also provides a method for preparing a warm-start DNA polymerase; the warm-start DNA polymerase comprises the DNA polymerase and the aptamer, and the aptamer binds to the G-quadruplex binding peptide through the G-quadruplex to bind to the DNA polymerase, and the method comprising the following steps:

dissolving the aptamer in a first buffer, denaturing at 90° C.-100° C. for 2 min to 8 min, cooling to 20° C.-30° C. to obtain the treated aptamer; and adding the DNA polymerase and the treated aptamer to a second buffer at a preset molar concentration ratio, and incubating at 2° C.-6° C. for 30 min to 60 min;

the first buffer comprises 10 mM Tris-HCl (pH 7.4), 75 mM KCl, 0.5 mM EDTA and 0.2 mg/ml bovine serum albumin, and the second buffer comprises 20 mM Tris-HCl (pH 8.8), 10 mM $(NH_4)_2SO_4$, 50 mM KCl, 2-8 mM $MgSO_4$, and 0.1% Tween-20.

As an embodiment, the preset molar concentration ratio of the DNA polymerase to the aptamer is between 1:8 and 1:1.

The disclosure also provides an application of the DNA polymerase in combination with the aptamer for detecting a nucleic acid or synthesizing a nucleic acid.

As an embodiment, the DNA polymerase in combination with the aptamer is used for detecting human papilloma virus DNA or SARS-CoV-2 virus RNA.

The disclosure constructs a DNA polymerase fused with G-quadruplex binding peptide and an aptamer that specifically binds to the polymerase. The activity of the DNA polymerase is strictly inhibited by the bound aptamer at the low temperature stage, but the activity is completely recovered when heated to the reaction temperature; when the DNA polymerase is applied to isothermal amplification, non-specific amplification will not occur; therefore, it has great application value in molecular diagnosis; the modified DNA polymerase constructed and the aptamer specifically binding to the DNA polymerase are used to successfully solve the problem of non-specific amplification of HPV DNA and SARS-CoV-2 RNA detected by LAMP; The binding of G-quadruplex binding peptide to G-quadruplex aptamer provides a new approach for the development of a controllable DNA polymerase.

Example 1

Construction of a Modified DNA Polymerase

The pCold-I-BST-LF plasmid was constructed by inserting the large fragment of Bst DNA polymerase (Bst-LF) into pCold-I vector through the Nde I and Xba I sites. The pCold-I-G4P-BST and pCold-I-RHAU23-BST were constructed by inserting the coding sequences of G4P and RHAU23 to the N-terminal of BST-LF based on pCold-I-BST-LF.

Figure 1B:
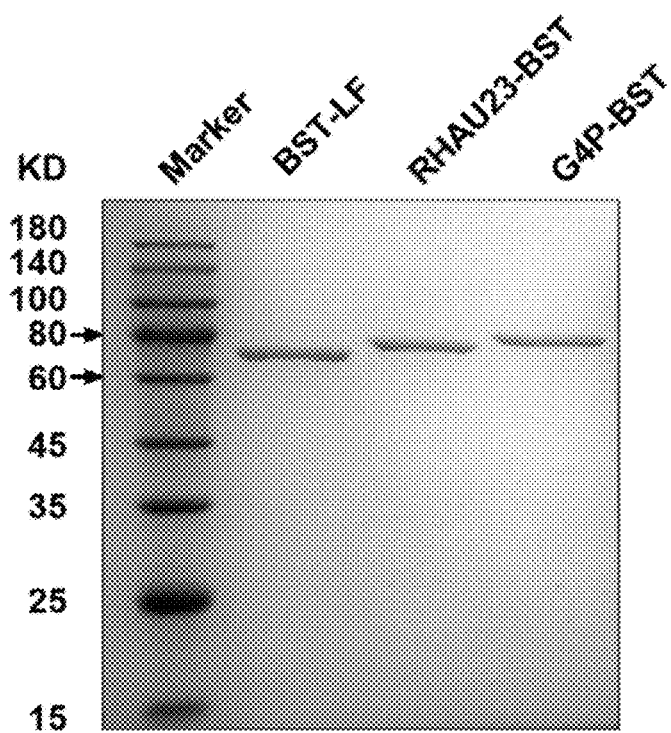
FIG. 1B is an electropherogram of purified Bst-LF, RHAU23-Bst and G4P-Bst provided by Example 1 of the disclosure.

The pCold-I-BST-LF, pCold-I-G4P-BST and pCold-I-RHAU23-BST plasmids were transformed into the *E. coli* strain BL21. Cells were grown in LB medium supplemented with 50 µg/mL Ampicillin at 37° C. until OD 0.8-1.0. Then, protein expression was induced by adding 0.4 mM IPTG and culturing at 16° C. for another 16 h. Proteins were purified using His-Tag cobalt resin (Thermo Scientific) according to the manual. Purified proteins were stored in a buffer containing 20 mM Tris-HCl, 150 mM NaCl, 1 mM DTT, 0.5 mM EDTA and 50% glycerol. FIG. 1A showed the structural representations of Bst DNA polymerase, Bst-LF and modified DNA polymerase; the modified DNA polymerase was fused with G-quadruplex binding peptide, which was represented by G4P-Bst and RHAU23-Bst. FIG. 1B showed the electropherograms of purified Bst-LF, RHAU23-Bst and G4P-Bst.

Bst-LF is derived from residues 291-878 of DNA polymerase I of *Bacillus stearothermophilus* (ARA98840.1), namely, the portion of the *Bacillus stearothermophilus* DNA polymerase that lacks 5'-3' exonuclease domain. The amino acid sequence of Bst-LF was shown in SEQ ID NO: 3. BST-LF is active in a wide temperature range and has a strong strand displacement activity such that has been widely used in loop-mediated isothermal amplification (LAMP). RHAU23 is a 23 amino acids peptide from human DHX36 protein which specifically interacts with G-quadruplex. The amino acid sequence of RHAU23 was shown in SEQ ID NO: 1 G4P is a small protein (64-amino acids) composed of two RHAU23 in series, which has stronger G-quadruplex binding affinity than RHAU23. The amino acid sequence of G4P was shown in SEQ ID NO: 2. The pCold-I-G4P-Bst plasmid profile was shown in FIG. 1D, and the pCold-I-RHAU23-Bst plasmid profile was shown in FIG. 1E.

Figure 1C:
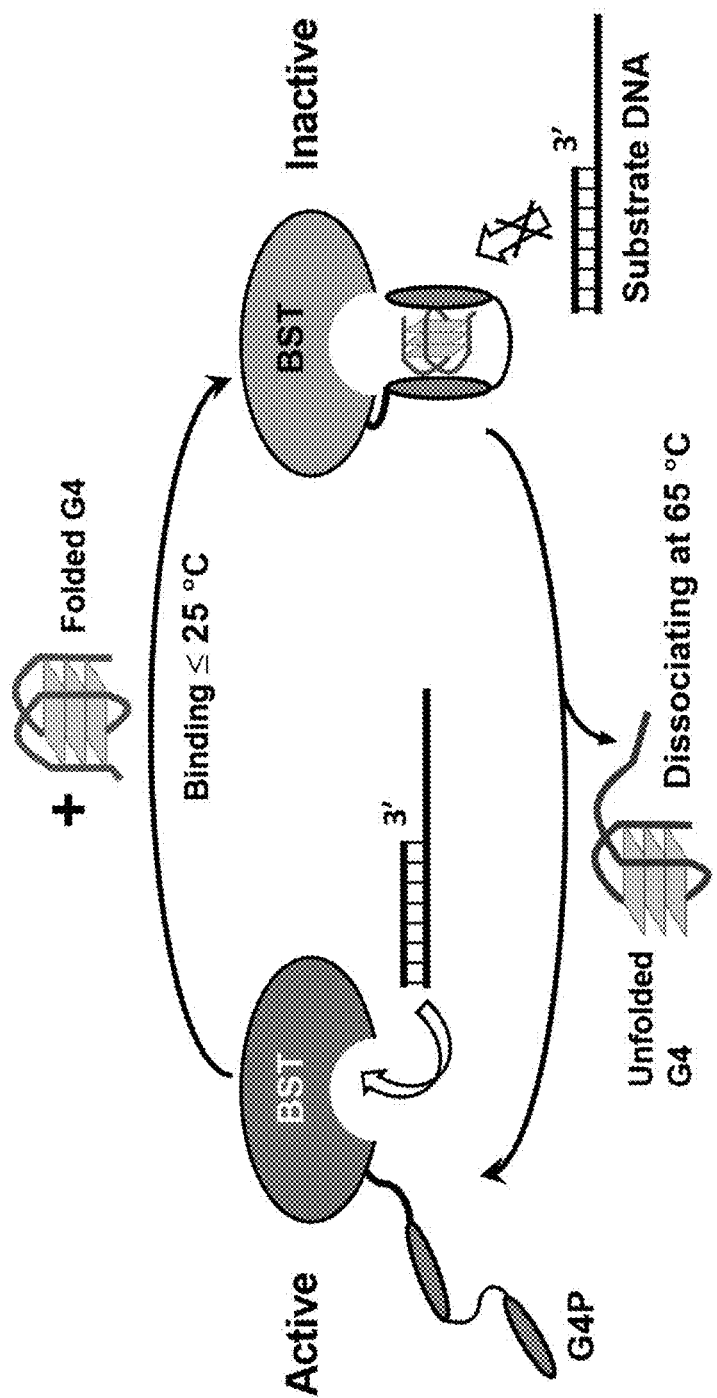
FIG. 1C is a schematic diagram of the principle of G-quadruplex aptamer regulating DNA polymerase activity at different temperatures provided by Example 1 of the disclosure.
Figure 1D:
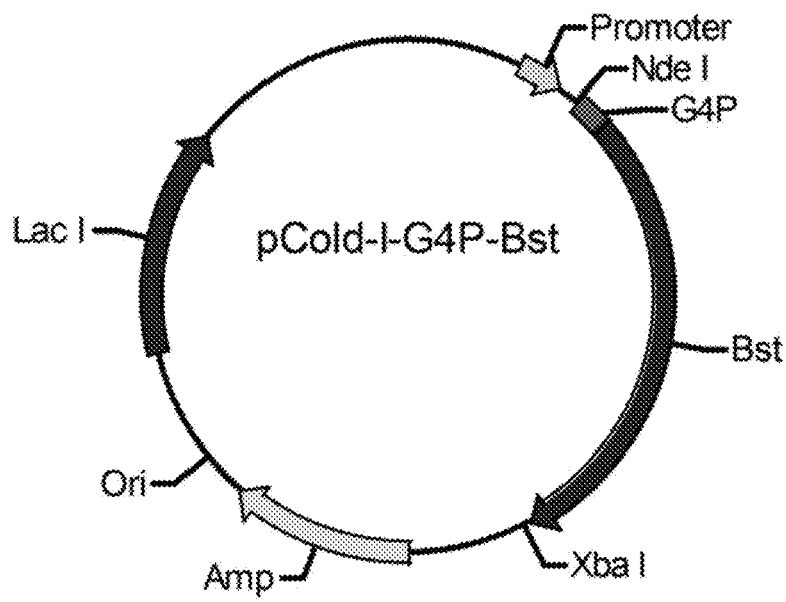
FIG. 1D is a pCold-I-G4P-Bst plasmid profile provided by Example 1 of the disclosure.
Figure 1E:
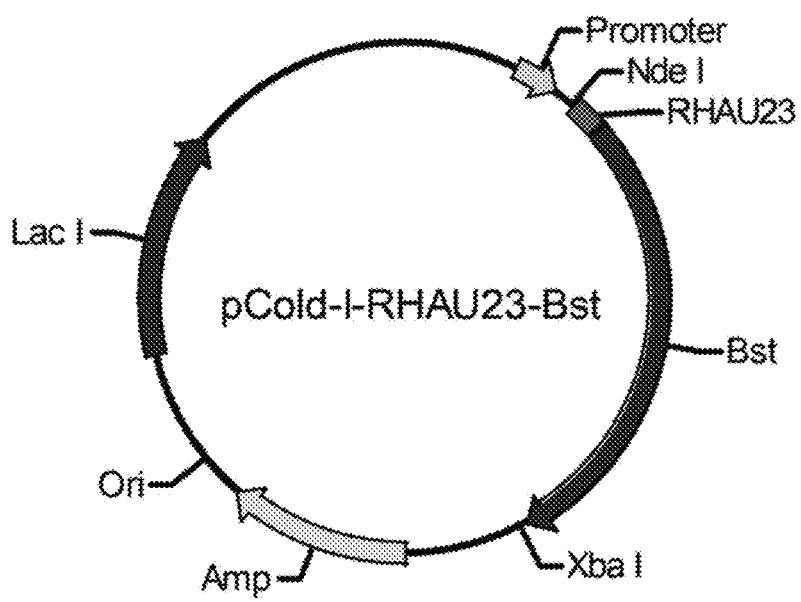
FIG. 1E is a pCold-I-RHAU23-Bst plasmid profile provided by Example 1 of the disclosure.

The modified DNA polymerase provided in this example can bind to an aptamer with G-quadruplex by fusing G-quadruplex binding peptide to the N-terminal. As shown in FIG. 1C, at the low temperature stage, binding the DNA polymerase fused to G-quadruplex binding peptide with a G-quadruplex would prevent the interaction of the DNA polymerase with the substrate DNA; Whereas at the high temperature stage, the G-quadruplex DNA would be unfolded and dissociated from the polymerase, allowing the DNA polymerase to act on the substrate again.

Example 2

Detection of the Binding Affinity of the Modified DNA Polymerase to the Aptamer by Electrophoretic Mobility Shift Assay (EMSA)

Oligonucleotides were purchased from Sangon Biotech Co., Ltd (China). Double-stranded DNAs (dsDNA) were paired from the complementary single-stranded DNA (ssDNA) by denaturing at 95° C. for 5 min and subsequently cooling to 25° C. in a buffer containing 10 mM Tris-HCl (pH 7.4), 75 mM KCl and 0.5 mM EDTA. 20 nM 5'-FAM-labeled aptamer DNA (Table 1) was dissolved in a first buffer, denatured at 95° C. for 5 min and subsequently cooled to 25° C. at a rate of 0.1° C./s; the first buffer contained 10 mM Tris-HCl (pH 7.4), 75 mM KCl, 0.5 mM EDTA, and 0.2 mg/ml BSA. Then each aptamer DNA and the specified concentration of DNA polymerase fused to G-quadruplex binding peptide were added into a second buffer, to bind at 4° C. for 1 hour, to form a DNA-protein complex; the second buffer contained 20 mM Tris-HCl (pH 8.8), 10 mM $(NH_4)_2SO_4$, 50 mM KCl, 2-8 mM $MgSO_4$, and 0.1% Tween-20.

The binding of aptamer to DNA polymerase was detected by electrophoretic mobility shift assay. Specifically, DNA-protein complex was electrophoresed on 8% or 12% non-denatured polyacrylamide gel containing 75 mM KCl at 4° C. for 2 h in 1×TBE buffer containing 75 mM KCl. The DNA-protein complex was photographed by the ChemiDoc MP imaging system (Bio-Rad) and digitized by the Image Quant 5.2 software.

Figure 2A:
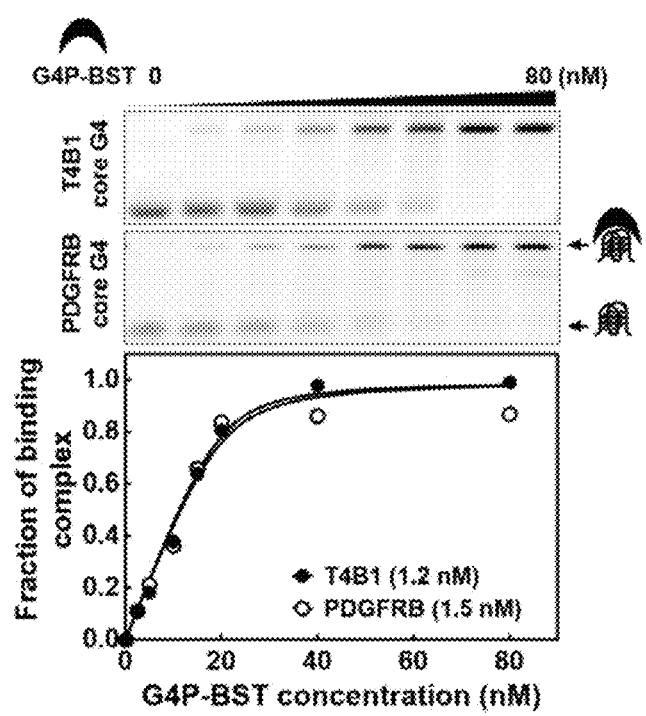
FIG. 2A to FIG. 2C are diagrams showing the results of the binding ability of DNA polymerase G4P-Bst to aptamer T4B1 core G4, PDGFRB core G4, T4B1 Fs-G4, PDGFRB Fs-G4, T4B1 Fd-G4 and PDGFRB Fd-G4 provided by Example 2 of the disclosure.
Figure 2B:
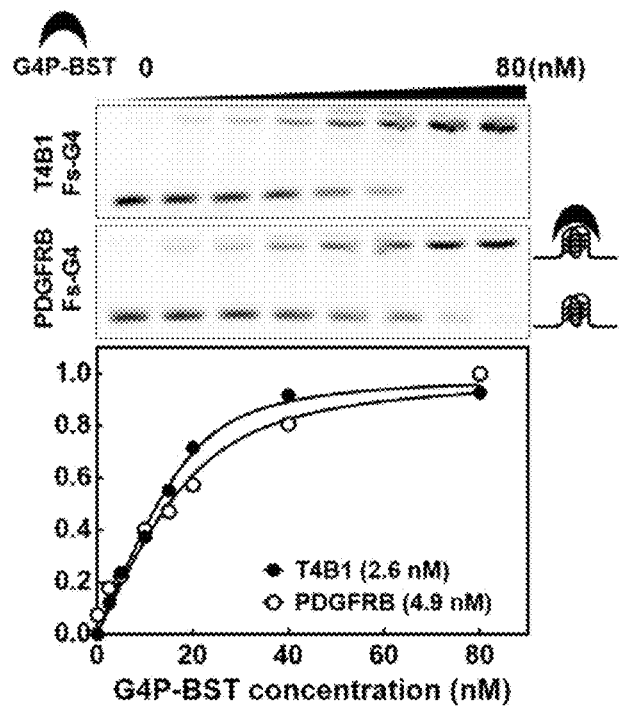
Figure 2C:
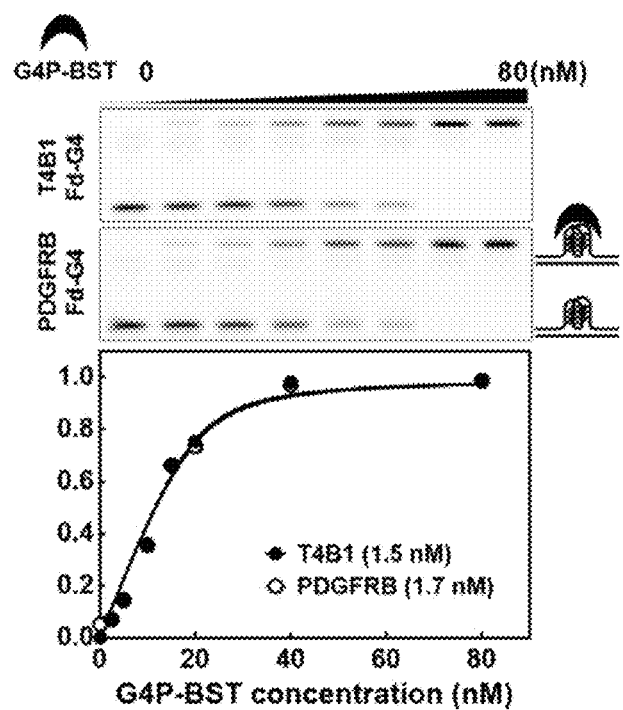
Figure 2D:
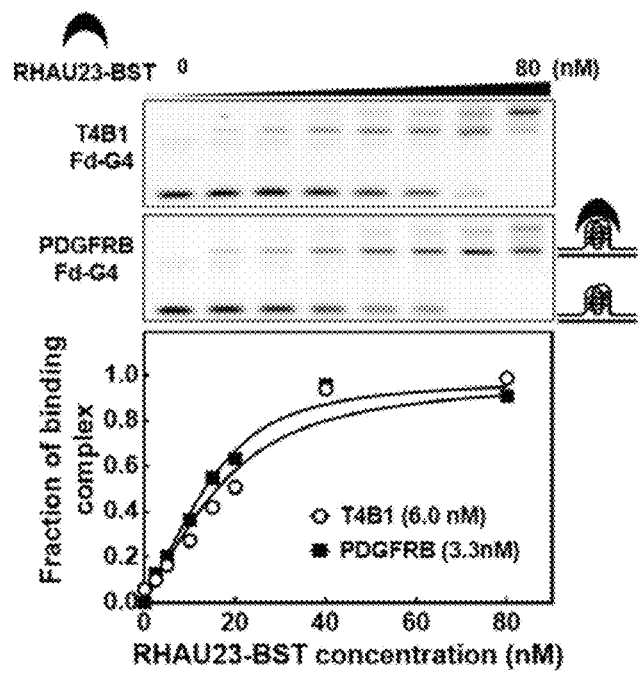
FIG. 2D is a diagram showing the results of the binding ability of DNA polymerase RHAU23-Bst to aptamer T4B1 Fd-G4 and PDGFRB Fd-G4 provided by Example 2 of the disclosure.
Figure 2E:
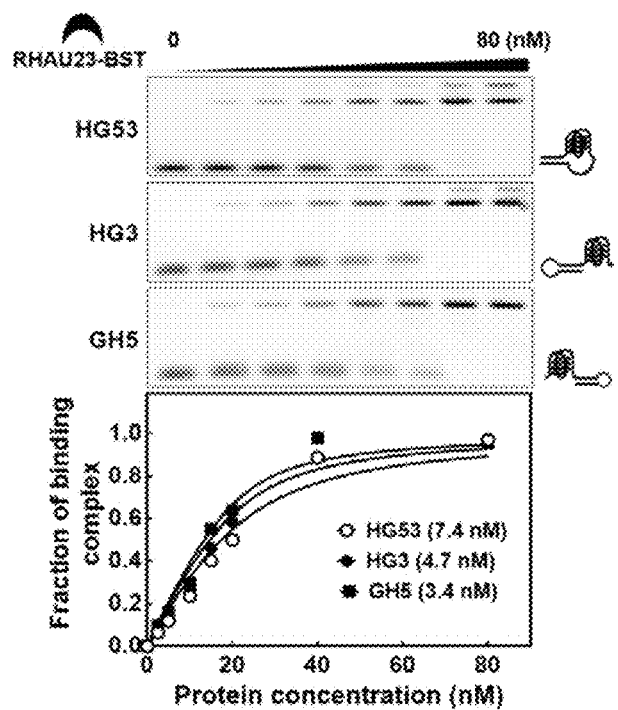
FIG. 2E is a diagram showing the results of the binding ability of DNA polymerase RHAU23-Bst to aptamer HG53, HG3 and GH5 provided by Example 2 of the disclosure.

The results were shown in FIG. 2A to FIG. 2E. FIG. 2A to FIG. 2C showed the binding ability of modified DNA polymerase G4P-Bst to aptamer T4B1 core G4, PDGFRB core G4, T4B1 Fs-G4, PDGFRB Fs-G4, T4B1 Fd-G4 and PDGFRB Fd-G4; the core G4 represented the core G-quadruplex, Fs-G4 represented the G-quadruplex with flanking single-stranded DNA, Fd-G4 represented the G-quadruplex with flanking double-stranded DNA; FIG. 2D showed the binding ability of modified DNA polymerase RHAU23-Bs to aptamer T4B1 Fd-G4 and PDGFRB Fd-G4, FIG. 2E showed the binding ability of modified DNA polymerase RHAU23-Bst to aptamer HG53, GH5, HG3; the aptamer HG53, GH5, HG3 could be folded into a DNA structure containing a G-quadruplex and a hairpin, and the Fd-G4 aptamer was formed by pairing two complementary single-stranded DNAs.

As shown in the figures, regardless of whether the bulged G-quadruplex of T4B1 and the bulged G-quadruplex of PDGFRB have flanking DNA sequences or not, G4P-Bst showed a strong binding affinity to the bulged G-quadruplex of T4B1 and bulged G-quadruplex of PDGFRB. The Kd values ranged from 1 nM to 5 nM. RHAU23-Bst also showed a strong binding affinity to the aptamer containing G-quadruplex and flanking double-stranded DNA, with Kd at the nM level. The binding affinity of RHAU23-Bst to the aptamer HG53, GH5, HG3 was similar to that of RHAU23-Bst to the aptamer containing G-quadruplex and flanking double-stranded DNA, and the Kd value ranged from 3.4 nM to 7.4 nM.

TABLE 1

| Name | Sequence |
|---|---|
| T4B1-core-G4 | 5'FAM-GTTTTGGTGGGTGGGTGGG-3' (SEQ ID NO: 8) |
| T4B1-Fs-G4 | 5'FAM-CCTGAAGCAGACAGCTAGTGAA TTCGTTTTGGTGGGTGGGTGGGTACTTG CGTATAACTGTTCCATAGT-3' (SEQ ID NO: 16) |
| T4B1-Fd-G4 | 5'FAM-CCTGAAGCAGACAGCTAGTGAA TTC-GTTTTGGTGGGTGGGTGGG-TACT TGCGTATAACTGTTCCATAGT-3' (SEQ ID NO: 16) and |

TABLE 1-continued

| Name | Sequence |
|---|---|
| | 3'-GGACTTCGTCTGTCGATCACTTAA GTTTTTTTTTTTTTTTTTTTATGAA CGCATATTGACAAGGTATCA-5' (SEQ ID NO: 17) |
| PDGFRB-core G4 | 5'FAM-GGGAGGGCGGCGGGGCAGGG-3' (SEQ ID NO: 9) |
| PDGFRB-Fs-G4 | 5'FAM-CCTGAAGCAGACAGCTAGTGA ATTCGGGAGGGCGGCGGGGCAGGGTACTTGC GTATAACTGTT-CCATAGT-3' (SEQ ID NO: 18) |
| PDGFRB-Fd-G4 | 5'FAM-CCTGAAGCAGACAGCTAGTGAATTCGGG AGGGCGGCGGGGCAGGG-TACTTGCGTA TAACTGTTCCATAGT-3' (SEQ ID NO: 18) and 3'-GGACTTCGTCTGTCGATCACTTAAG TTTTTTTTTTTTTTTTTTTATGAACG CATATTGACAAGGTATCA-5' (SEQ ID NO: 17) |
| HG53 | 5'FAM-CAGACCAGAAGTTTTGGTGGGT GGGTGGGATTTTTTTTTTACTGGTCTG-3' (SEQ ID NO: 19) |
| GH5 | 5'FAM-AAGTTTTGGTGGGTGGGTGGGA TCAGACCAGTTTTCTGGTCTG-3' (SEQ ID NO: 20) |
| HG3 | 5'FAM-CAGACCAGTTTTCTGGTCTGA AGTTTTGGTGGGTGGGTGGGAT-3' (SEQ ID NO: 21) |
| non-G4 dsDNA | 5'FAM-ACTATGGAACAGTTATACGCAA GTATTTTTTTTTTTTTTTTTTTGAAT TCACTAGCTGTCTGCTTCAGG-3' (SEQ ID NO: 22) and 3'-TGATACCTTGTCAATATGCGTTCAT AAAAAAAAAAAAAAAAAAAACTTAAGT GATCGACAGACGAAGTCC-5' (SEQ ID NO: 23) |
| non-G4 SSDNA | 5'FAM-ACTATGGAACAGTTATACGCAA GTATTTTTTTTTTTTTTTTTTTGAAT TCACTAGCTGTCT-GCTTCAGG-3' (SEQ ID NO: 24) |

Example 3

Detection of the Regulation of Aptamer on the Activity of DNA Polymerase Through Primer Extension Assay Aptamer DNAs (Table 2) were dissolved to 10 μM in the first buffer to 10 μM, heated at 95° C. for 5 min and subsequently cooled to 25° C. at a rate of 0.1° C./s; the first buffer contained 10 mM Tris-HCl (pH 7.4), 75 mM KCl, 0.5 mM EDTA, and 0.2 mg/ml BSA. Then the specified concentration of DNA polymerase (100 nM) fused to G-quadruplex binding peptide and the aptamer were added into a second buffer, placed at 4° C. for 30 min, to form a DNA-protein complex; the molar concentration ratio of the DNA polymerase fused to G-quadruplex binding peptide to the aptamer was 1:0, 1:1, 1:2, 1:4 and 1:8 respectively, the second buffer contained 20 mM Tris-HCl (pH 8.8), 10 mM $(NH_4)_2SO_4$, 50 mM KCl, 8 mM $MgSO_4$, and 0.1% Tween-20. Primer extension was started by adding 2.5 mM dNTP, 100 nM primer and 100 nM template DNA into the protein-binding complex and incubated at 25° C. or 65° C. for 5 min or 40 min; the sequences of the primer and the template DNA were shown in Table 3. Reactions were terminated by adding 4-fold volume of stop buffer (99% formamide, 0.1% SDS and 20 mM EDTA). Samples were boiled at 95° C. for 5 min and loaded on a 12% urea denaturing polyacrylamide gel in 1×TBE buffer. Primer and the full-length product were photographed by ChemiDoc MP Imaging System (Bio-Rad) and digitized by the Image Quant 5.2 software.

TABLE 2

| Name | Sequence |
|---|---|
| T4B1-core G4 | 5'-GTTTTGGTGGGTGGGTGGG-3' (SEQ ID NO: 8) |
| T4B1-Fs-G4 | 5'-CCTGAAGCAGACAGCTAGTGAATTC GTTTTGGTGGGTGGGTGGGTACTTGCGT ATAACTGTTCCATAGT-3' (SEQ ID NO: 16) |
| T4B1-Fd-G4 | 5'-CCTGAAGCAGACAGCTAGTGAATTC- GTTTTGGTGGGTGGGTGGG-TACTTGCGT ATAACTGTTCCATAGT-3' (SEQ ID NO: 16) and 3'-GGACTTCGTCTGTCGATCACTTAAGT TTTTTTTTTTTTTTTTATGAACGCA TATTGACAAGGTATCA-5' (SEQ ID NO: 17) |
| PDGFRB-core G4 | 5'-GGGAGGGCGGCGGGGCAGGG-3' (SEQ ID NO: 9) |
| PDGFRB-Fs-G4 | 5'-CCTGAAGCAGACAGCTAGTGAATTCGG GAGGGCGGCGGGGCAGGGTACTTGCGTATA ACTGTTCCATAGT-3' (SEQ ID NO: 18) |
| PDGFRB-Fd-G4 | 5'-CCTGAAGCAGACAGCTAGTGAATTCGG GAGGGCGGCGGGGCAGGG-TACTTGCGTAT AACTGTTCCATAGT-3' (SEQ ID NO: 18) and 3'-GGACTTCGTCTGTCGATCACTTAAGTT TTTTTTTTTTTTTTTTTATGAACGCATA TTGACAAGGTATCA-5' (SEQ ID NO: 17) |
| non-G4 dsDNA | 5'-ACTATGGAACAGTTATACGCAAGTATTT TTTTTTTTTTTTTTTTGAATTCACTAGCT GTCTGCTTCAGG-3' (SEQ ID NO: 22) and 3'-TGATACCTTGTCAATATGCGTTCATAAA AAAAAAAAAAAAAAAAACTTAAGTGATCGA CAGACGAAGTCC-5' (SEQ ID NO: 23) |
| non-G4 SSDNA | 5'-ACTATGGAACAGTTATACGCAAGTATTT TTTTTTTTTTTTTTTTGAATTCACTAGCT GTCT-GCTTCAGG-3' (SEQ ID NO: 24) |
| HG53 (HG53-H8/T10) | 5'-CAGACCAGAAGTTTTGGTGGGTGGGTGG GATTTTTTTTTACTGGTCTG-3' (SEQ ID NO: 19) |
| GH5 | 5'-AAGTTTTGGTGGGTGGGTGGGATCAGA CCAGTTTTCTGGTCTG-3' (SEQ ID NO: 20) |
| HG3 | 5'-CAGACCAGTTTTCTGGTCTGAAGTTTT GGTGGGTGGGTGGGAT-3' (SEQ ID NO: 21) |
| HG53-H7 | 5'-AGACCAGAAGTTTTGGTGGGTGGGTGG GATTTTTTTTTACTGGTCT-3' (SEQ ID NO: 25) |
| HG53-H6 | 5'-GACCAGAAGTTTTGGTGGGTGGGTGGG ATTTTTTTTTTACTGGTC-3' (SEQ ID NO: 26) |

TABLE 2-continued

| Name | Sequence |
|---|---|
| HG53-H5 | 5'-ACCAGAAGTTTTGGTGGGTGGGTGGG ATTTTTTTTTTACTGGT-3' (SEQ ID NO: 27) |
| HG53-H4 | 5'-CCAGAAGTTTTGGTGGGTGGGTGGG ATTTTTTTTTTACTGG-3' (SEQ ID NO: 28) |
| HG53-T2 | 5'-CAGACCAGAAGTTTTGGTGGGTGGG TGGGATTACTGGTCTG-3' (SEQ ID NO: 29) |
| HG53-T4 | 5'-CAGACCAGAAGTTTTGGTGGGTGGGTGGG ATTTTACTGGTCTG-3' (SEQ ID NO: 30) |
| HG53-T6 | 5'-CAGACCAGAAGTTTTGGTGGGTGGGTGGG ATTTTTTACTGGTCTG-3' (SEQ ID NO: 31) |
| HG53-T8 | 5'-CAGACCAGAAGTTTTGGTGGGTGGGTGGG ATTTTTTTTACTGGTCTG-3' (SEQ ID NO: 32) |
| HG53-T12 | 5'-CAGACCAGAAGTTTTGGTGGGTGGGTGGG ATTTTTTTTTTTTACTGGTCTG-3' (SEQ ID NO: 33) |
| HG53-CSTB | 5'-CAGACCAGAAGGGGCGGGGCGCGGGGCGG GGATTTTTTTTTTACTGGTCTG-3' (SEQ ID NO: 34) |
| HG53-KIT | 5'-CAGACCAGAAGGGCGGGCGCGAGGGAGGG ATTTTTTTTTTACTGGTCTG-3' (SEQ ID NO: 35) |
| HG53-PDGFR | 5'-CAGACCAGAAGGGAGGGCGGCGGGGCAT TGATTTTTTTTTTACTGGTCTG-3' (SEQ ID NO: 36) |
| HG53-T1B1 | 5'-CAGACCAGAAGTGGTGGGTGGGTGGG ATTTTTTTTTTACTGGTCTG-3' (SEQ ID NO: 37) |
| HG53-GVBQ1 | 5'-CAGACCAGAATTTTGGTGGGTGGGTGGG ATTTTTTTTTTACTGGTCTG-3' (SEQ ID NO: 38) |
| HG53-GVBQ2 | 5'-CAGACCAGAATTTTGGGTGGTGGGTGGG ATTTTTTTTTTACTGGTCTG-3' (SEQ ID NO: 39) |
| HG53-G12 | 5'-CAGACCAGAATTTTGGTTGGTGGGTGGG ATTTTTTTTTTACTGGTCTG-3' (SEQ ID NO: 40) |
| HG53-non-G4 | 5'-CAGACCAGAAATTTTTTTTTACTGGTC TG-3' (SEQ ID NO: 41) |
| HG53-mut-G4 | 5'-CAGACCAGAAGTTTTAATAAATAAATAAA ATTTTTTTTTTACTGGTCTG-3' (SEQ ID NO: 42) |

TABLE 3

| Name | Sequence (5'-3') |
|---|---|
| CSTB-A | 5'-FAM-CCAGCCTGCGGCGAGTG-3' (SEQ ID NO: 43) |
| Template-GM | 5'-TCTATTACATTCTAAGAGTTAGAGTT AGGGTCTACTCTTCTTCTCTTCTTCACTC GCCGCAGGCTGG-3' (SEQ ID NO: 44) |

Figure 3A:
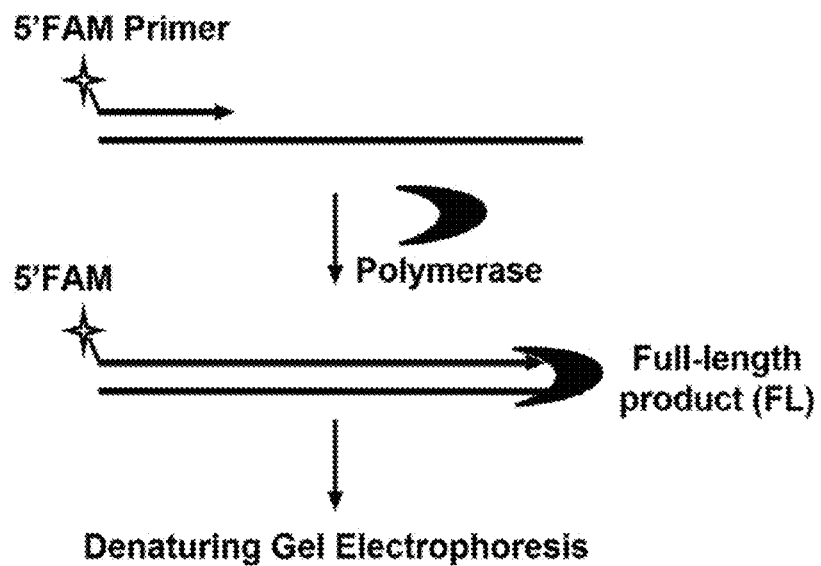
FIG. 3A is a schematic diagram of the primer extension assay provided by Example 3 of the disclosure.
Figure 3B:
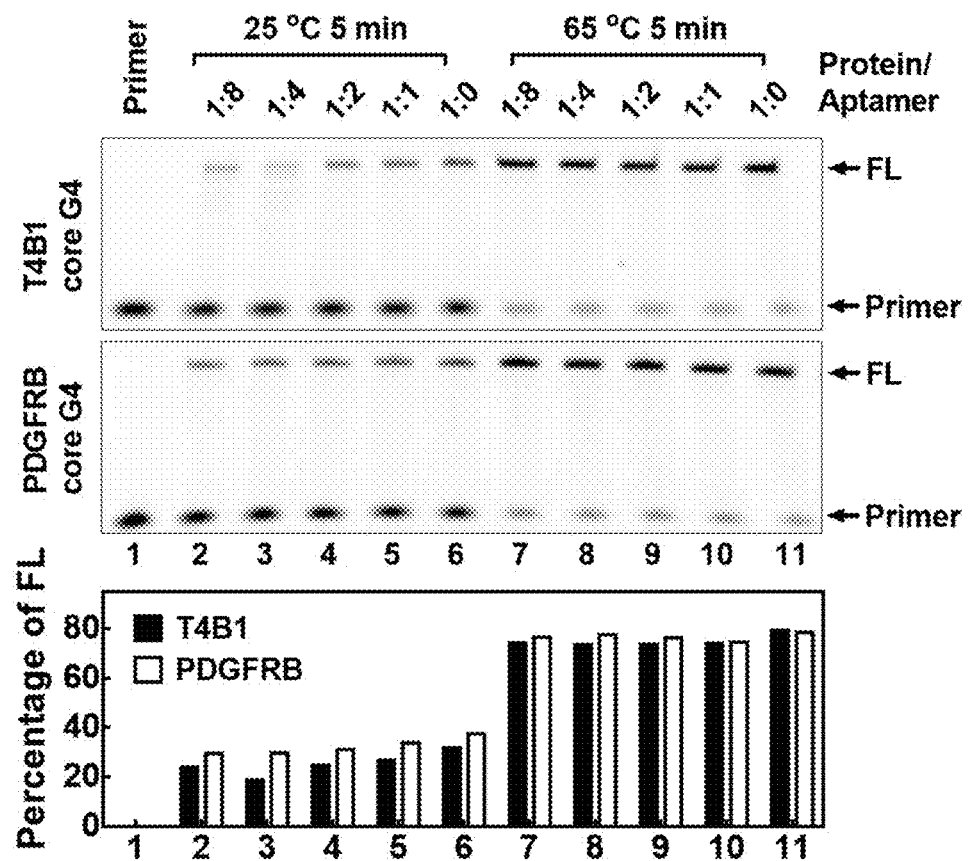
FIG. 3B to FIG. 3D are the results of the primer extension assay using DNA polymerase G4P-Bst provided by Example 3 of the disclosure.
Figure 3C:
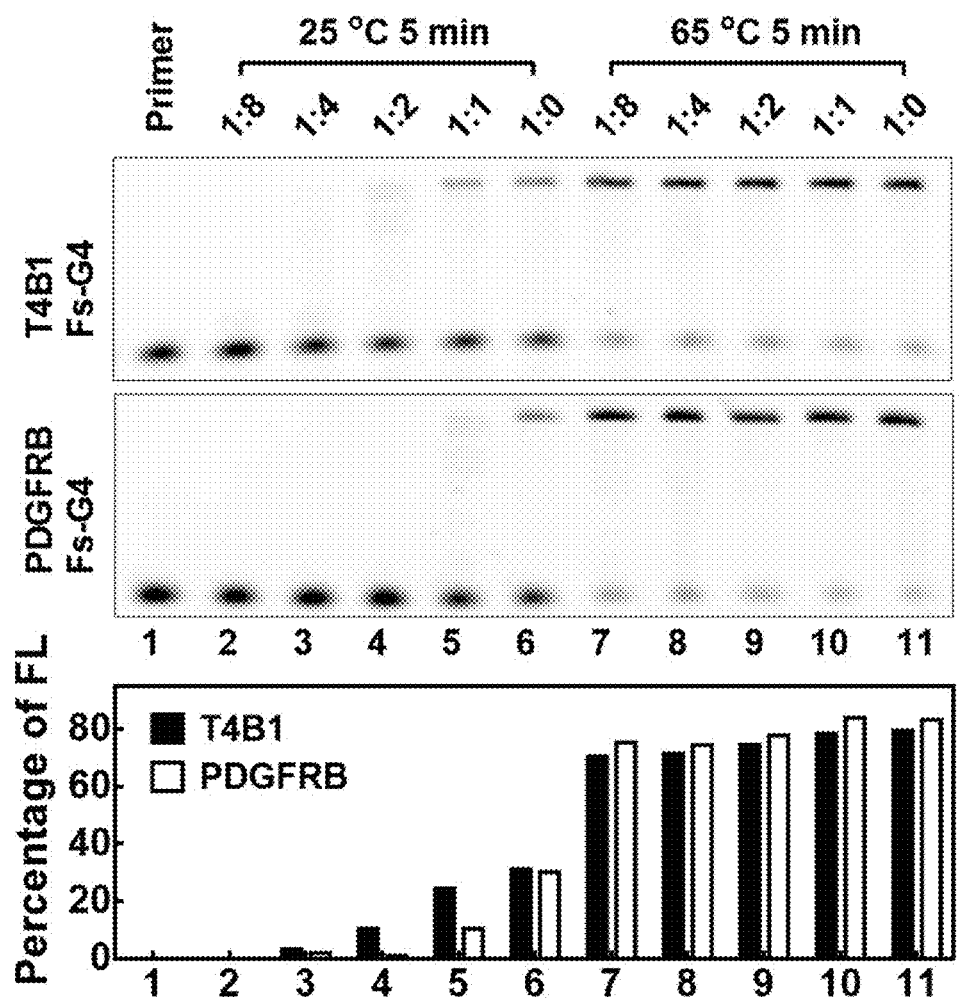
Figure 3D:
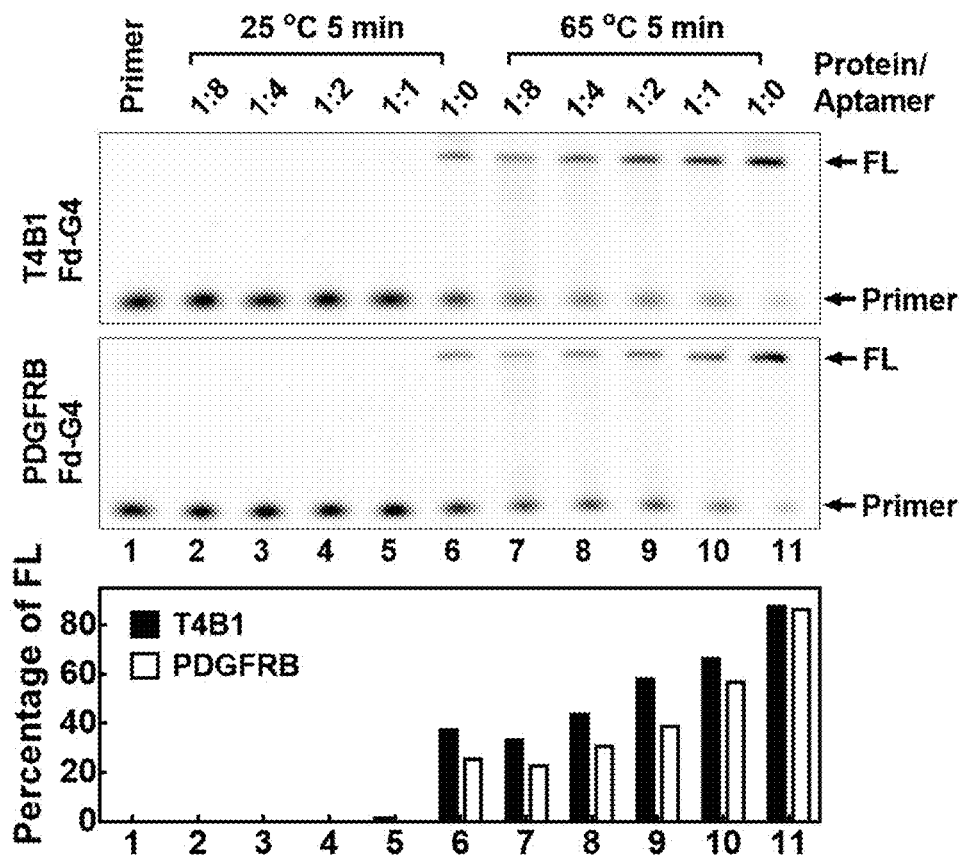

FIG. 3A showed the schematic diagram of the primer extension assay, FIG. 3B to FIG. 3D showed the results of the primer extension assay using the modified DNA polymerase G4P-Bst, and FIG. 3E to FIG. 3H showed the results of the primer extension assay using the modified DNA polymerase RHAU23-Bst.

As shown in the figures, when only a core G-quadruplex (core G4) was used as aptamer, namely, the aptamer contained no flanking DNA sequence, the activity of G4P-BST was almost unaffected, whether at 25° C. or 65° C., as shown in FIG. 3B; while when a G-quadruplex containing flanking single-stranded DNA (Fs-G4) was used as aptamer, the activity of G4P-Bst exhibited varying degrees of inhibition related to the ratio of modified DNA polymerase/aptamer at 25° C. and the activity of the modified DNA polymerase was almost recovered at 65° C., as shown in FIG. 3C for detail. When a G-quadruplex containing flanking double-stranded DNA (Fd-G4) was used as aptamer, the activity of G4P-Bst was almost completely inhibited at 25° C. when the ratio of DNA polymerase/aptamer was less than 1. The inhibition of Fd-G4 aptamer on the activity of G4PBst was so strong that it still worked at 65° C., as shown in FIG. 3D. Because the binding affinity of G4P-Bst to the three types of aptamers was similar and the effect of the aptamer containing a flanking DNA was obviously better, the DNA in the flanking regions of the G-quadruplex was also necessary for the aptamer to function.

Figure 3E:
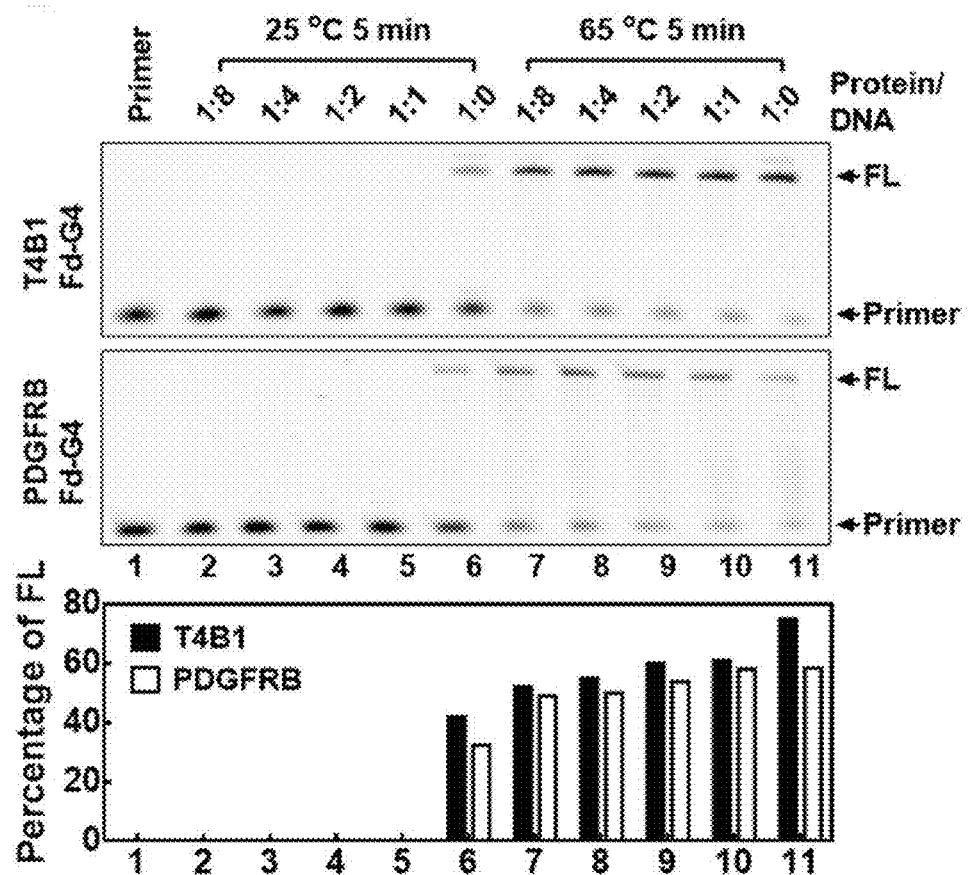
FIG. 3E to FIG. 3H are the results of the primer extension assay using DNA polymerase RHAU23-Bst provided by Example 3 of the disclosure.
Figure 3F:
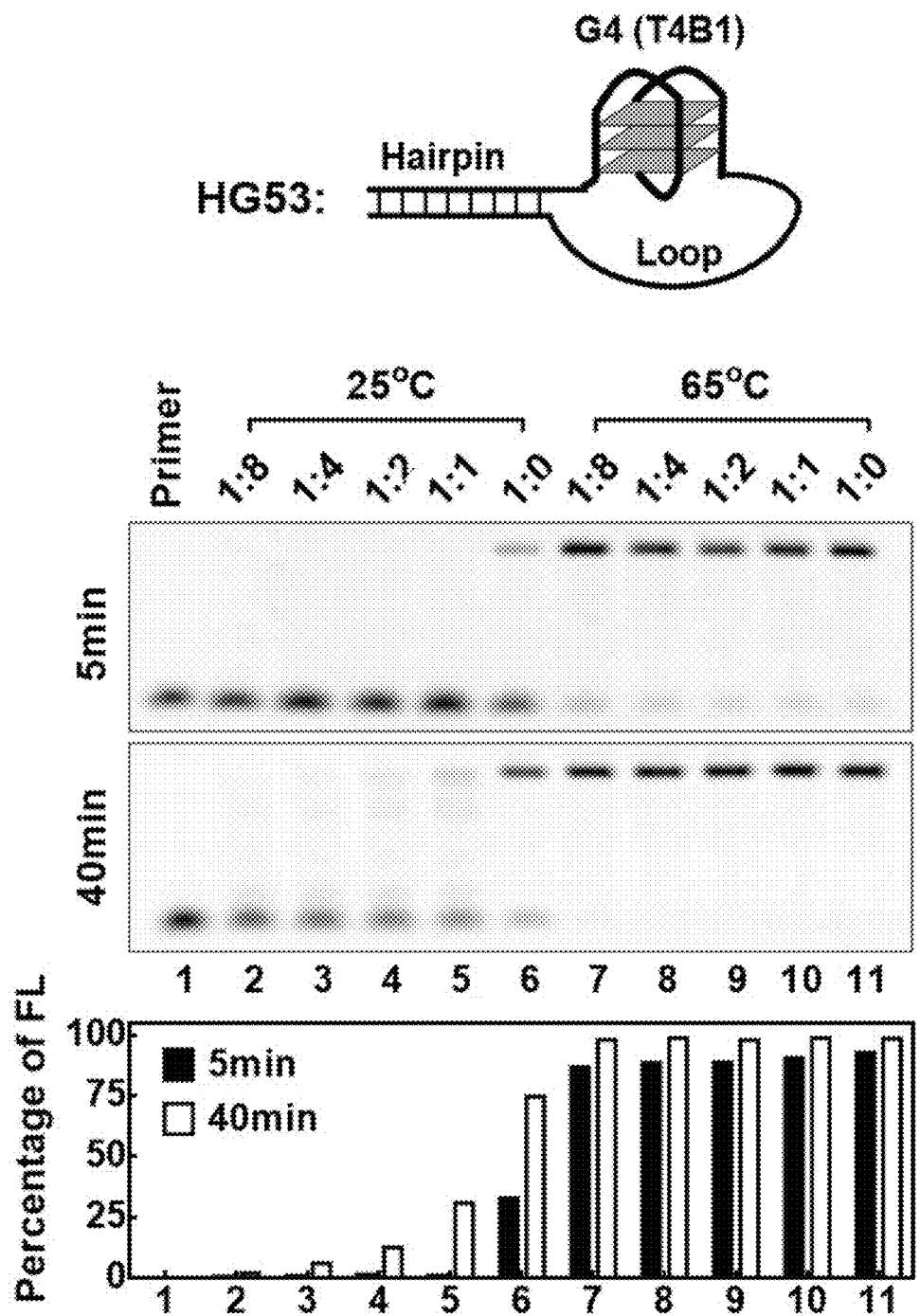
Figure 3G:
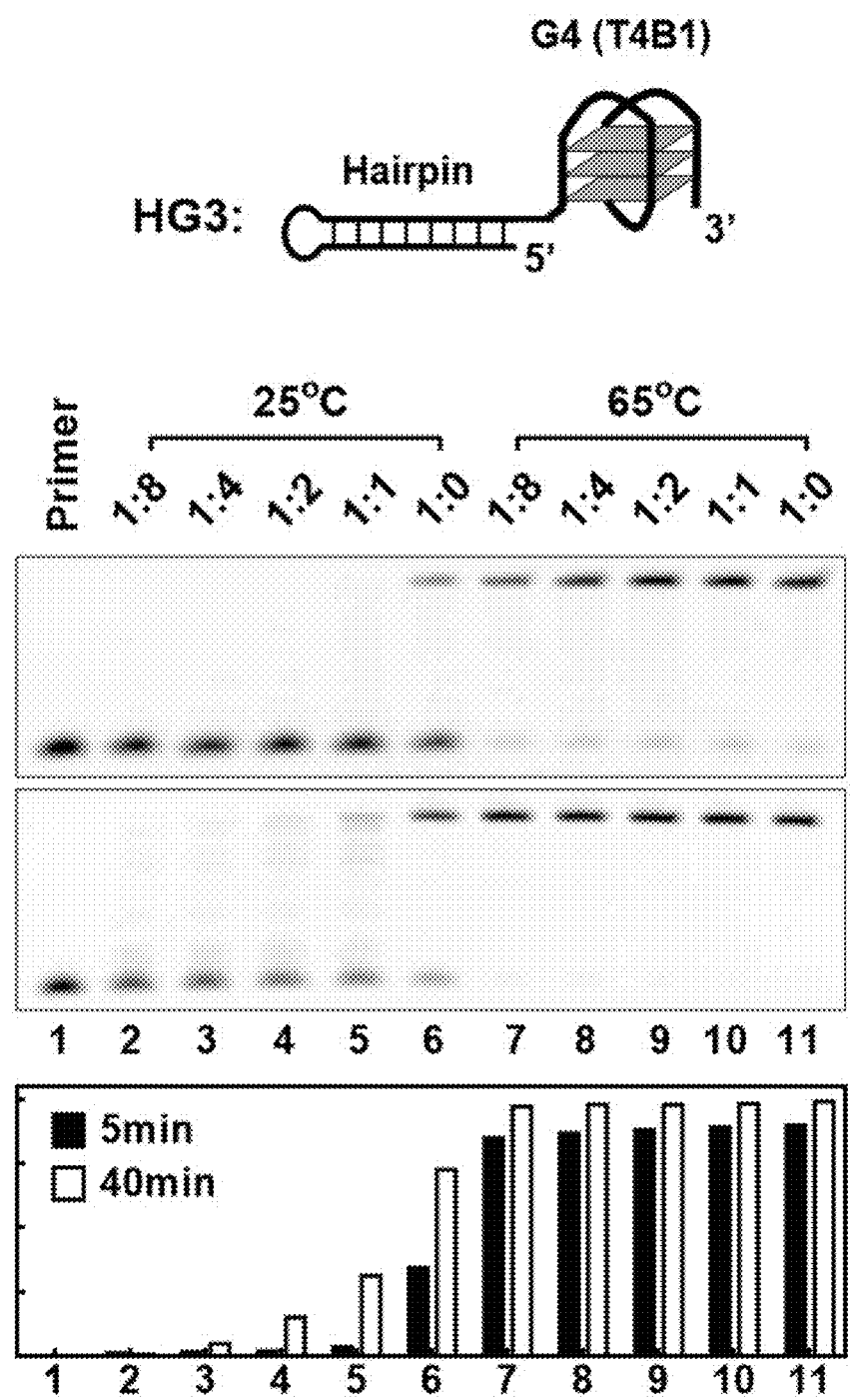
Figure 3H:
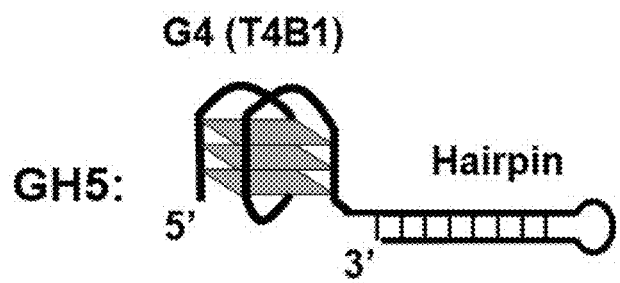
Figure 3H:
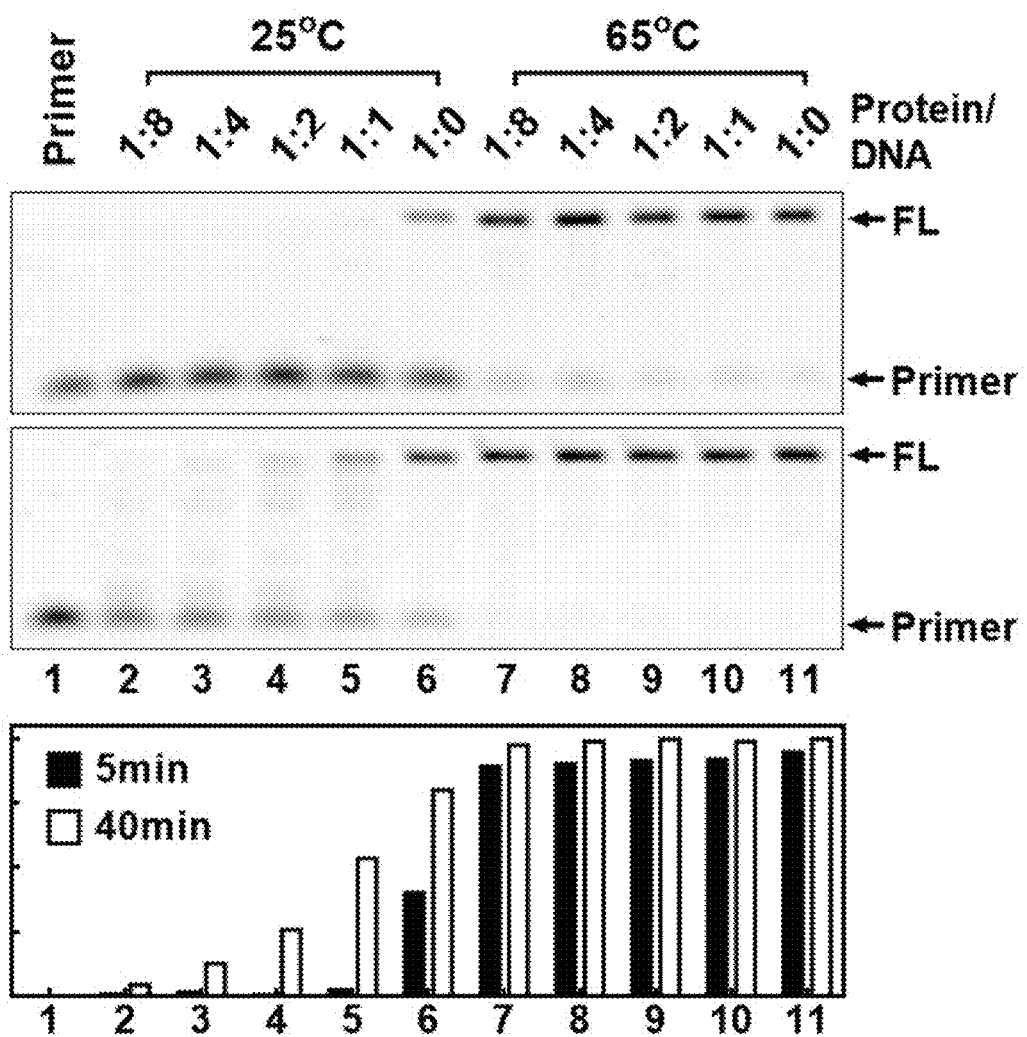
Figure 4A:
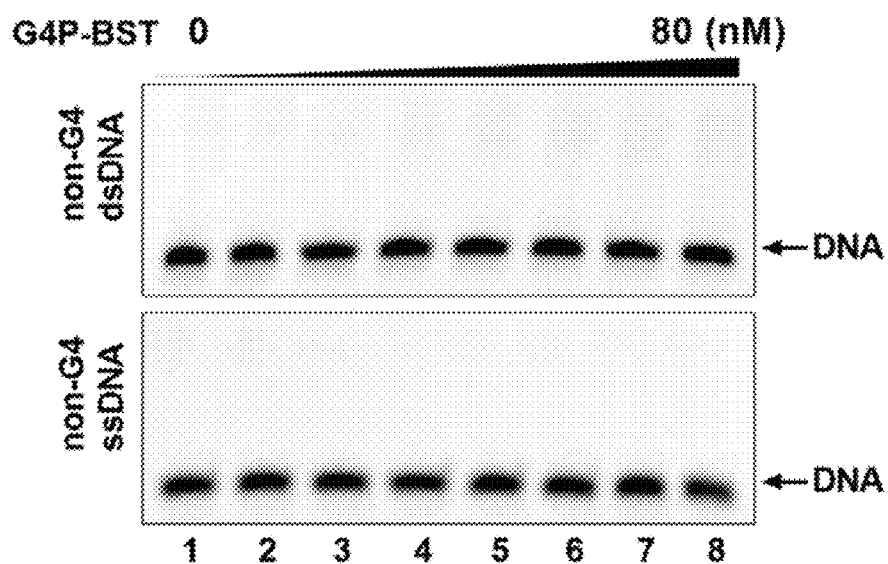
FIG. 4A is a diagram showing the results of binding ability of DNA polymerase G4P-Bst to non-G4 single-stranded DNA and non-G4 double-stranded DNA by EMSA provided by Example 4 of the disclosure.
Figure 4B:
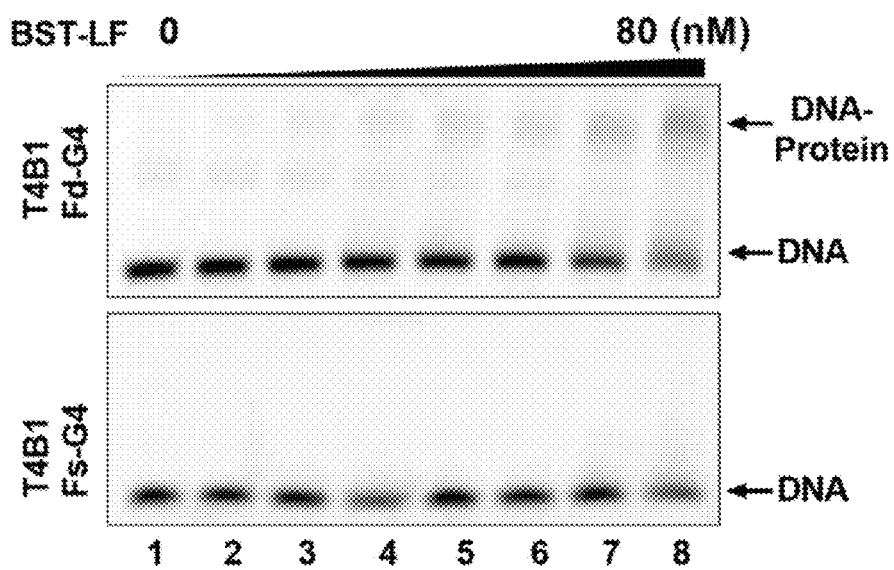
FIG. 4B is a diagram showing the results of binding ability of Bst-LF to T4B1 Fd-G4 and T4B1 Fs-G4 detected by EMSA provided by Example 4 of the disclosure.
Figure 4C:
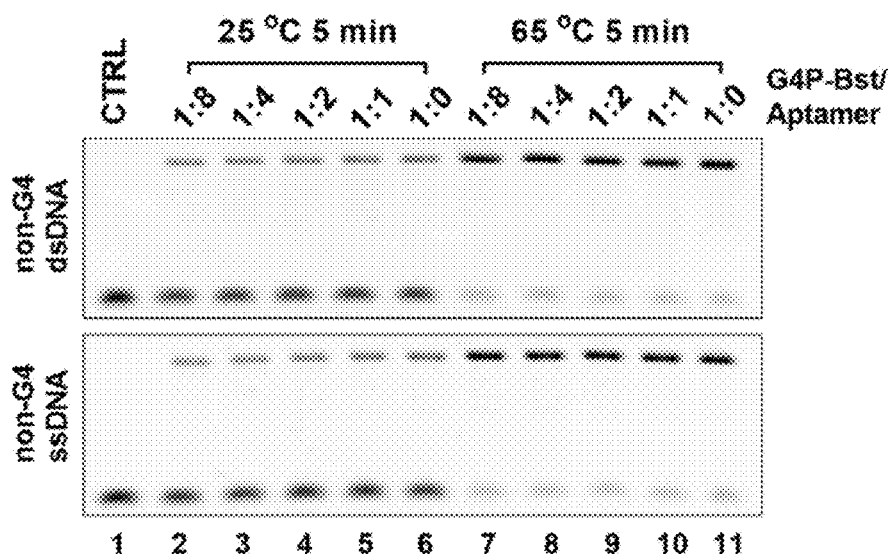
FIG. 4C is a diagram showing the G4P-Bst activity in the presence of non-G4 single-stranded DNA and non-G4 double-stranded DNA detected by primer extension assay provided by Example 4 of the disclosure.
Figure 4D:
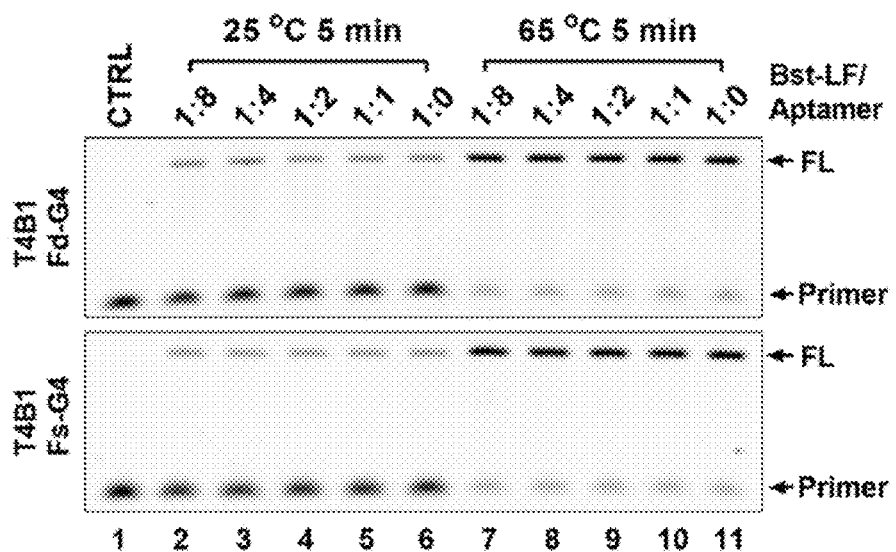
FIG. 4D is a diagram showing the Bst-LF activity in the presence of T4B1 Fd-G4 and T4B1 Fs-G4 detected by primer extension assay provided by Example 4 of the disclosure.

After G4P-Bst bound to Fd-G4 aptamer, its activity was inhibited greatly, and was not restored completely even if the temperature was raised to 65° C.; in contrast, after RHAU23-Bst bound to Fd-G4 aptamer, its activity at 65° C. was almost completely restored, as shown in FIG. 3E. The difference in inhibitory effect of aptamer on the two polymerases was related to the binding ability of G4P and RHAU23 to G4. This indicated that we could adjust the inhibitory ability of aptamers to enzymatic activity by changing the G-quadruplex binding peptide.

RHAU23-Bst, aptamer HG53, GH5, HG3 were strongly inhibited at 25° C., and the inhibition lasted for at least 40 min. The activity of RHAU23-Bst was recovered fully at 65° C. This indicated that the single-stranded DNA that could be folded into G-quadruplex and hairpin structures as an aptamer was sufficient to modulate the activity of the DNA polymerase fused to G-quadruplex binding peptide.

Thus, the modulation of the activity of the modified DNA polymerase by aptamer was affected by the flanking DNA sequence in the aptamer and the G-quadruplex binding peptide in the warm-start DNA polymerase based on G-quadruplex modulation. Moreover, the activities of the modified DNA polymerase G4P-Bst and RHAU23-Bst were inhibited at 25° C., which was close to room temperature; and the inhibition of polymerase activity at this temperature could effectively prevent the non-specific amplification.

Example 4

Detection of the Necessity of G-Quadruplex and G-Quadruplex Binding Peptide for Warm-Start DNA Polymerase by EMSA and Primer Extension Assay Referring to the experimental method of Example 2, the binding ability of DNA polymerase G4P-Bst to non-G4 single-stranded DNA and non-G4 double-stranded DNA was detected by EMSA, and the binding ability of Bst-LF to T4B1 Fd-G4 and T4B1 Fs-G4 was detected by EMSA.

Referring to the experimental method of Example 3, the activity of G4P-Bst was detected by the primer extension assay in the presence of non-G4 single-stranded DNA and non-G4 double-stranded DNA, and the activity of Bst-LF was detected by the primer extension assay in the presence of T4B1 Fd-G4 and T4B1 Fs-G4.

FIG. 4 showed the experimental results. FIG. 4A showed the result of detecting the binding ability of DNA polymerase G4P-Bst to non-G4 single-stranded DNA and non-G4 double-stranded DNA by EMSA; FIG. 4B showed the result of detecting the binding ability of Bst-LF to T4B1 Fd-G4 and T4B1 Fs-G4 by EMSA; FIG. 4C showed the result of a primer extension assay to detect the activity of G4P-Bst in the presence of non-G4 single-stranded DNA and non-G4 double-stranded DNA. FIG. 4D showed the result of a primer extension assay to detect the activity of Bst-LF in the presence of T4B1 Fd-G4 and T4B1 Fs-G4.

As shown in the figures, the removal of G-quadruplex from aptamer or removal of G-quadruplex binding peptide from DNA polymerase significantly reduced the binding affinity of DNA polymerase to aptamer, resulting in the inability to modulate the activity of DNA polymerase. Therefore, G-quadruplex in aptamer and G-quadruplex binding peptide in DNA polymerase are two indispensable parts that control the warm-start DNA polymerase.

Example 5

The ability of aptamer to inhibit the modified DNA polymerase was verified by the primer extension assay, which could be regulated by the type of G-quadruplex and the length of the hairpin structure.

5.1 The activity of modified DNA polymerase RHAU23-Bst was detected in the presence of HG53 aptamer containing different G-quadruplex by a primer extension assay at 25° C.

In this experiment, eight aptamers of four different G-quadruplex types were selected for the experiment. The eight aptamers were CSTB, Kit-C, PDGFRB, T1B1, T4B1, GVBQ1, GVBQ2 and G12, respectively. The G-quadruplex type of aptamer CSTB and Kit-C was a regular three-layered G-quadruplex, the G-quadruplex type of aptamer PDGFRB, T1B1 and T4B1 was a bulged G-quadruplex, and the G-quadruplex type of aptamer GVBQ1 and GVBQ2 was G-vacancy bearing G-quadruplex, the G-quadruplex type of aptamer G12 was regular two-layered G-quadruplex. The molar concentration ratio of RHAU23-Bst to aptamer was 1:2.

Figure 5:
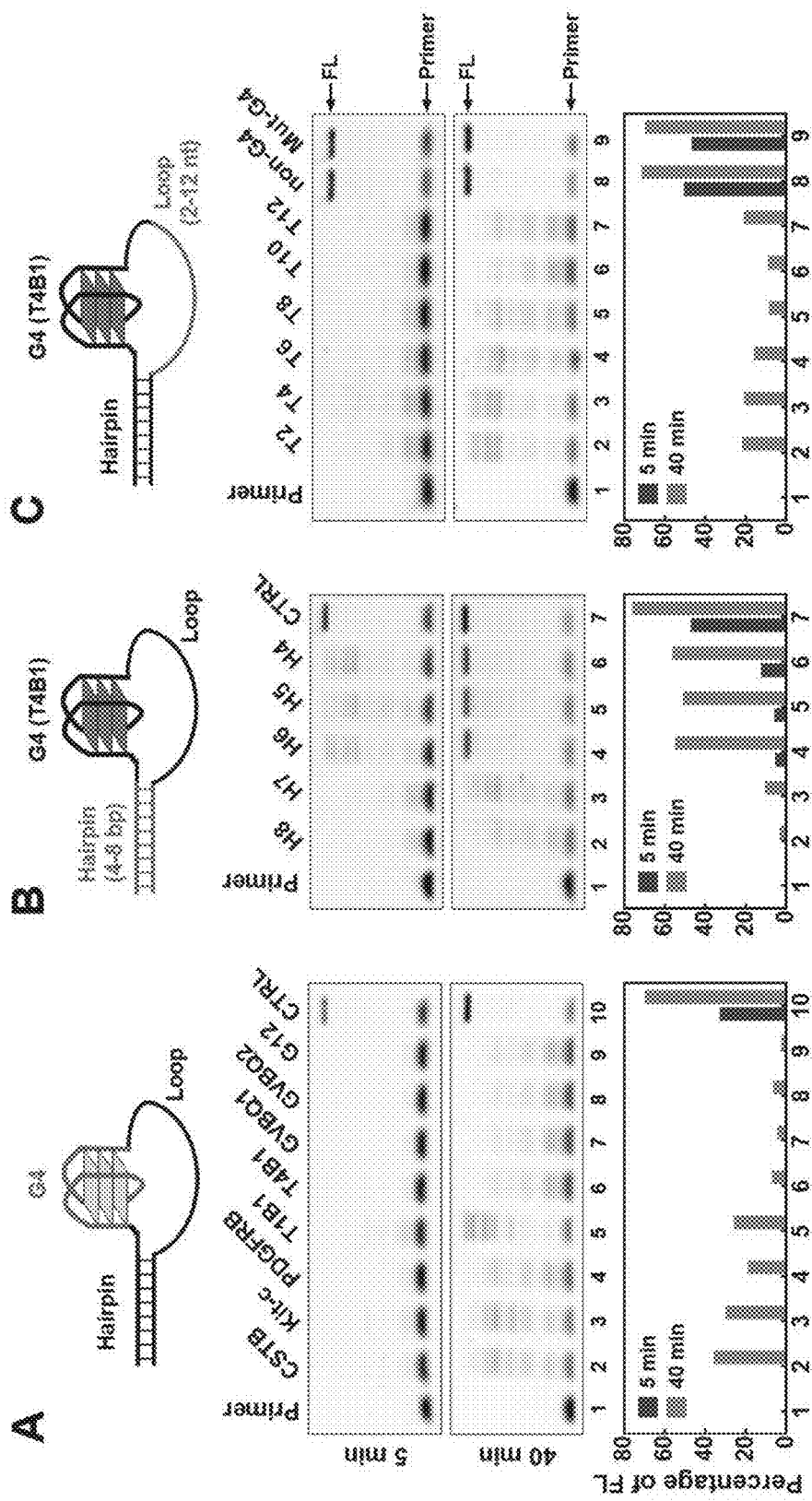
FIG. 5 is a diagram showing the effect of G-quadruplex type, hairpin structure length and loop length on the ability of aptamer (HG53) to inhibit the activity of DNA polymerase RHAU23-Bst provided by Example 5 of the disclosure.
Figure 6A:
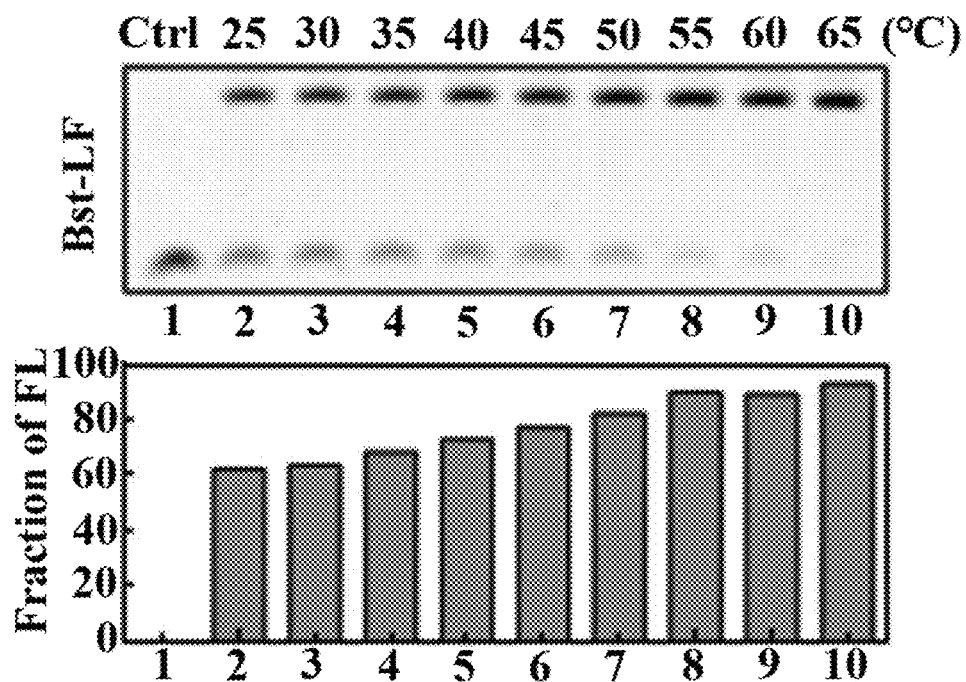
FIG. 6A is a diagram showing the results of primer extension assay of Bst-LF at different temperatures provided by Example 6 of the disclosure.
Figure 6B:
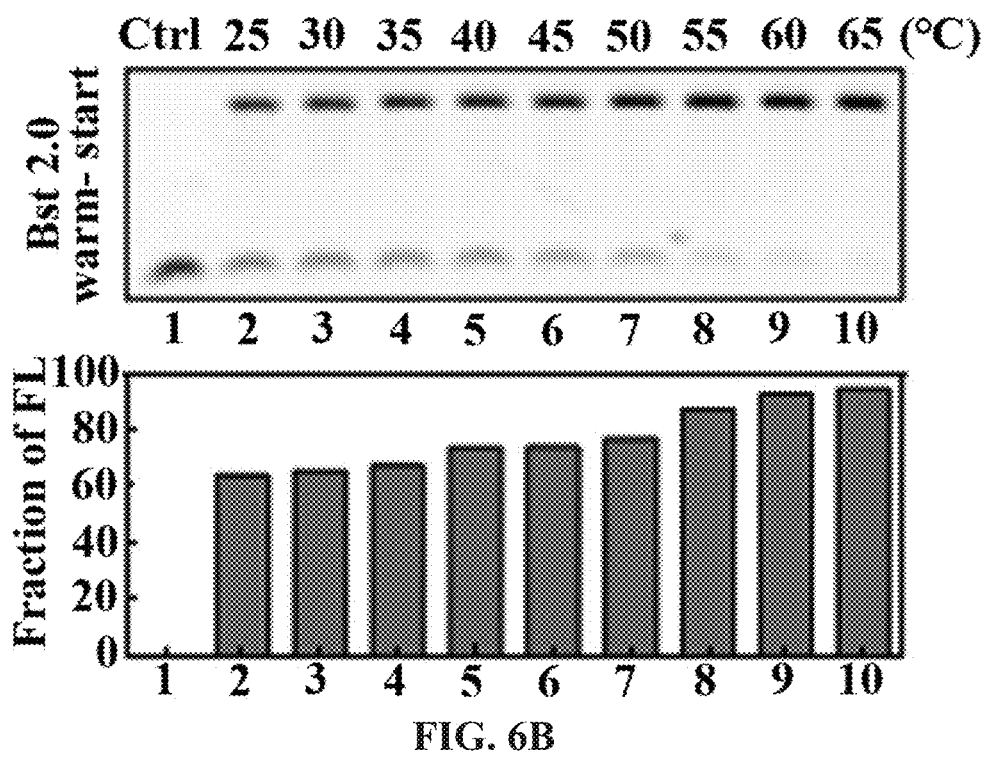
FIG. 6B is a diagram showing the results of primer extension assay of Bst 2.0 warm-start DNA polymerase at different temperatures provided by Example 6 of the disclosure.
Figure 6C:
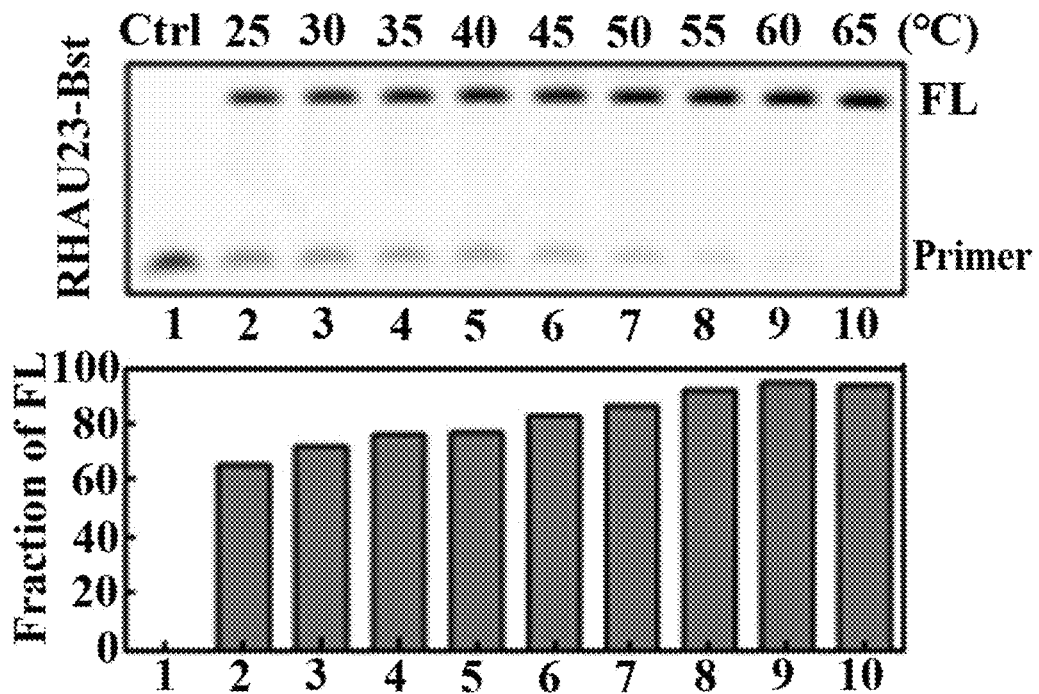
FIG. 6C is a diagram showing the results of primer extension assay of RHAU23-Bst at different temperatures in the absence of aptamer provided by Example 6 of the disclosure.
Figure 6D:
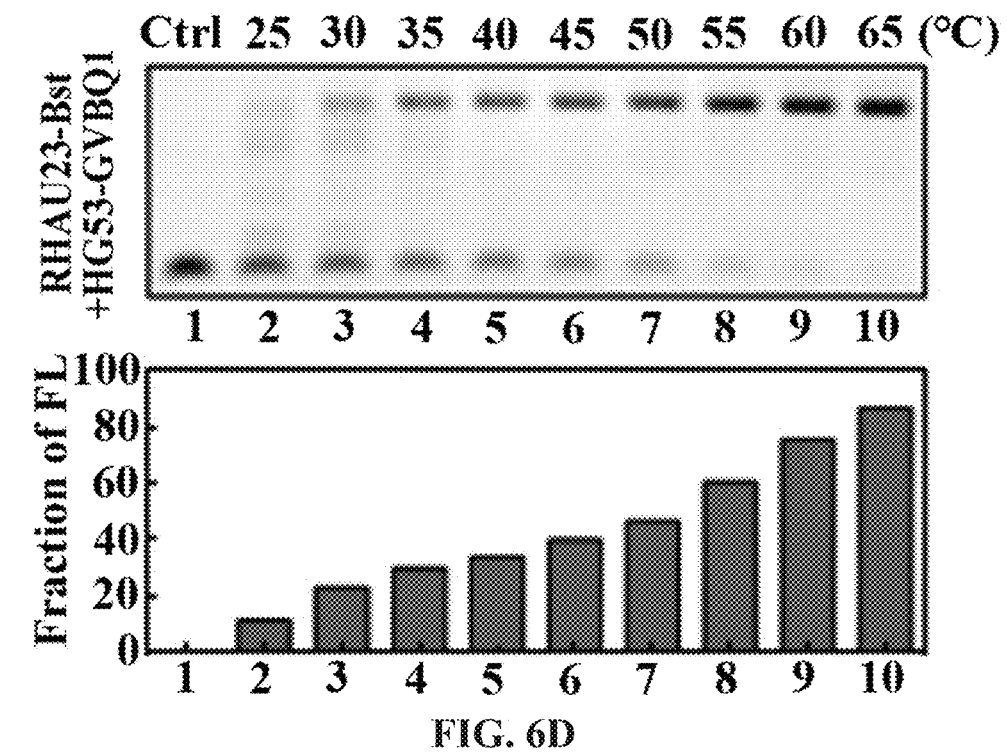
FIG. 6D is a diagram showing the results of primer extension assay of RHAU23-Bst at different temperatures in the presence of aptamer HG53-GVBQ1 provided by Example 6 of the disclosure.
Figure 6E:
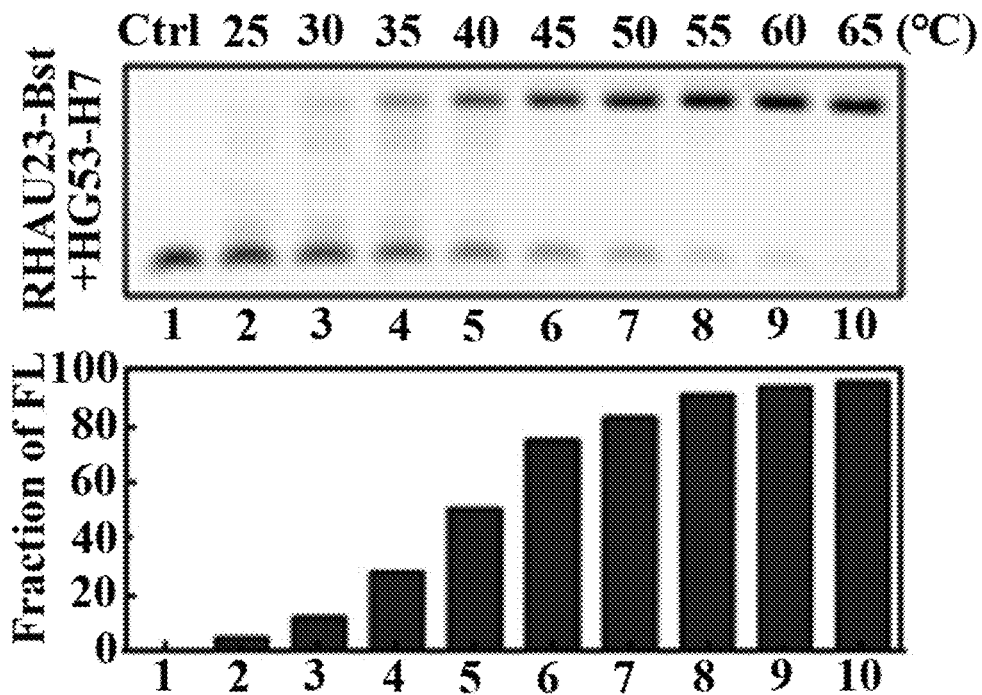
FIG. 6E is a diagram showing the results of primer extension assay of RHAU23-Bst at different temperatures in the presence of aptamer HG53-H7 provided by Example 6 of the disclosure.
Figure 6F:
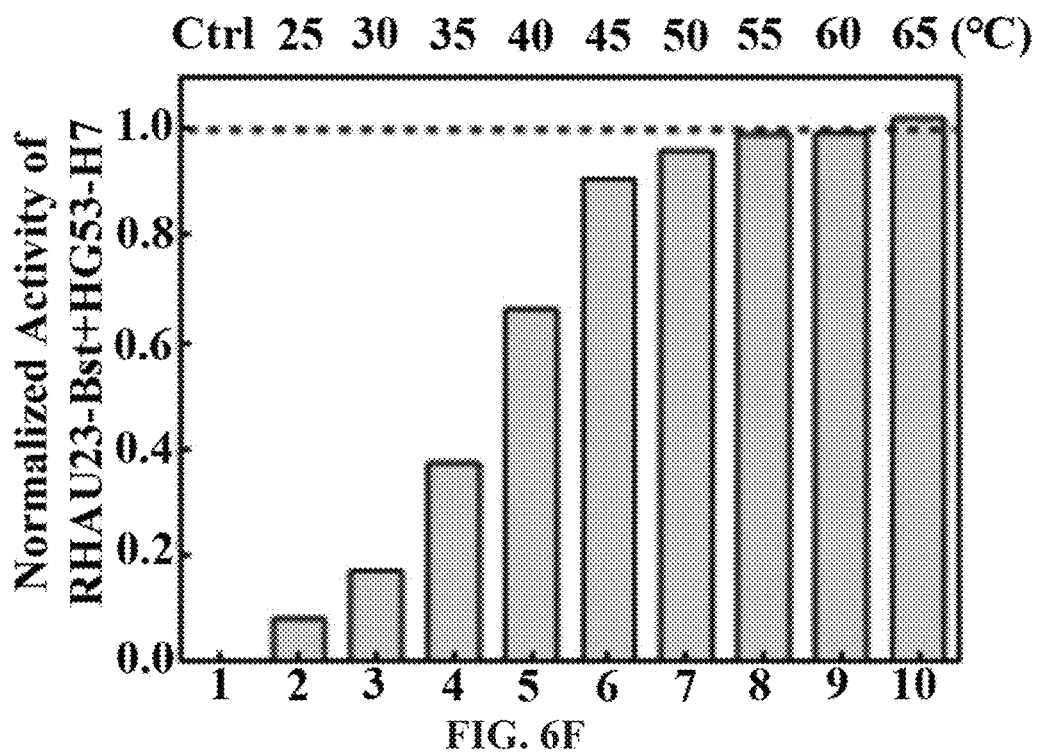
FIG. 6F is a diagram showing the normalized activity results of RHAU23-Bst in the presence of aptamer HG53-H7 provided by Example 6 of the disclosure.

The results were shown in FIG. 5A. It could be found that all of the eight aptamers could effectively inhibit the activity of modified DNA polymerase. The aptamer containing non-canonical G-quadruplex (T4B1, GVBQ1 and GVBQ2) and the aptamer containing double-layered G-quadruplex (G12) could inhibit the activity of the modified DNA polymerase for at least 40 minutes.

5.2 The activity of modified DNA polymerase RHAU23-Bst was detected in the presence of HG53 aptamer containing different lengths of hairpin structure by a primer extension assay at 25° C.

In this experiment, the HG53 aptamers with hairpin structure lengths of 8 bp, 7 bp, 6 bp, 5 bp and 4 bp were selected, and the molar concentration ratio of RHAU23-Bst to aptamer was 1:2.

The results were shown in FIG. 5B; H8 represented an aptamer with a hairpin structure length of 8 bp, H7 represented an aptamer with a hairpin structure length of 7 bp, and H6 represented an aptamer with a hairpin structure length of 6 bp, H5 represented an aptamer with a hairpin structure length of 5 bp. As shown in the figure, the length of the hairpin region needed to be at least 7 bp for the aptamer to function effectively.

5.3 The activity of modified DNA polymerase RHAU23-Bst was detected in the presence of HG53 aptamer with different loop lengths by a primer extension assay at 25° C.

Compared to GH5 and HG3, HG53 had an additional loop connecting the G-quadruplex and the hairpin. This loop mainly affected the formation of the hairpin at the DNA end. In the experiments of this example, HG53 aptamers with loop lengths of 2 nt, 4 nt, 6 nt, 8 nt, 10 nt and 12 nt were used for the experiment. The molar concentration ratio of RHAU23-Bst to aptamer was 1:2.

The results were shown in FIG. 5C. From the figure, the length of the loop needed to be 6 nt or more. In addition, experiments were carried out with the aptamer with the deletion of G-quadruplex or sequence mutation, and it was found that the deletion of G-quadruplex or sequence mutation made the aptamer not to inhibit the modified DNA polymerase any longer. Thus, G-quadruplex is the key component of aptamer.

Example 6

Detection of the Ability of Aptamer to Inhibit the Activity of Bst DNA Polymerase at Different Temperatures Referring to the experimental method of Example 3, the inhibitory effects of aptamer HG53-GVBQ1 and HG53-H7 on three Bst DNA polymerases at different temperatures were detected by a primer extension assay. Among them, the three Bst DNA polymerases were Bst-LF, Bst 2.0 warm-start DNA polymerase (a commercial warm-start DNA polymerase of NEB Company) and modified DNA polymerase RHAU23-Bst; the detection temperature was 25° C.-65° C.; the final reaction concentration of Bst-LF and RHAU23-Bst was 100 nM, and the concentration of Bst 2.0 warm-start DNA polymerase was 0.32 U/μL; the concentration of aptamer was 200 nM; the reaction buffer was the second buffer, containing 20 mM Tris-HCl (pH 8.8), 10 mM (NH$_4$)$_2$SO$_4$, 50 mM KCl, 8 mM MgSO$_4$, and 0.1% Tween-20.

FIG. 6 showed the experimental results of this example. Referring to FIG. 6A to FIG. 6C, in the absence of aptamer binding, three Bst DNA polymerases (Bst-LF, Bst 2.0 warm-start DNA polymerase and RHAU23-Bst) showed similar activity when synthesizing DNA at 25° C.-65° C. Referring to FIG. 6D and FIG. 6E, the activity of the warm-start enzyme after binding of RHAU23-Bst to aptamer HG53-H7 and HG53-GVBQ1 was greatly inhibited below 30° C. FIG. 6F showed the normalized activity of RHAU23-Bst in the presence of HG53-H7 by comparing the fraction of its full-length (FL) product with that of RHAU23-Bst. As shown in the figure, aptamer HG53-H7 inhibited the activity of RHAU23-Bst by more than 80% at a temperature below 30° C.; and the activity of RHAU23-Bst gradually recovered at a temperature above 35° C., and the activity of RHAU23-Bst recovered to more than 90% at a temperature above 50° C. Based on the experimental results, the activity of RHAU23-Bst bound to aptamer could be precisely initiated by increasing the temperature (warm start), to effectively inhibit the non-specific amplification at low temperature; while the commercial Bst 2.0 warm-start DNA polymerase was hardly inhibited at low temperature. Therefore, the modified DNA polymerase provided in this application contributed to its wide application in the detection of nucleic acids.

Example 7

Detection of Human Papillomavirus (HPV) DNA with Warm-Start DNA Polymerase

Figure 7:
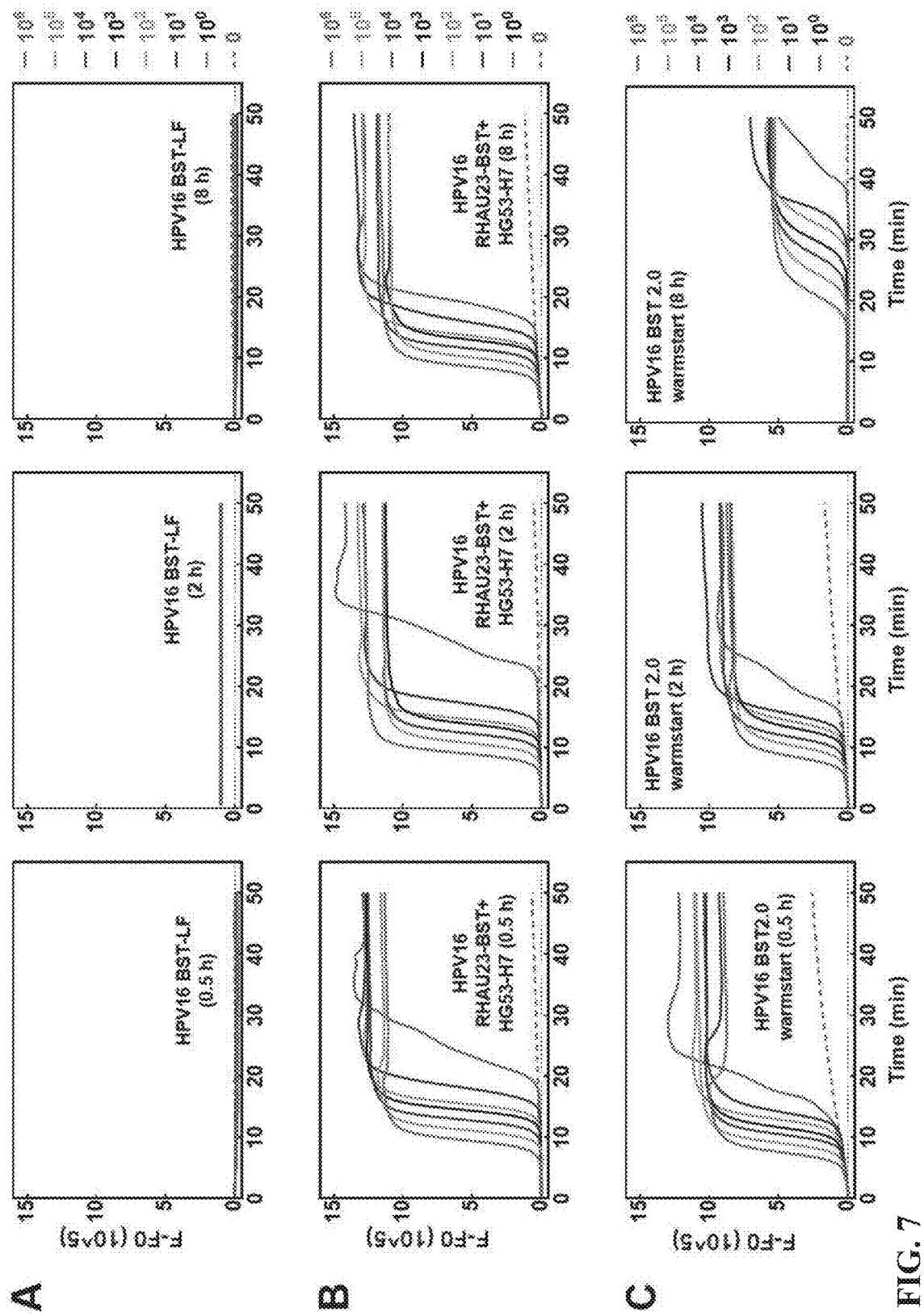
FIG. 7 is the fluorescent LAMP result of HPV 16 gene DNA provided by Example 7 of the disclosure.

Detection was performed by loop-mediated isothermal amplification (LAMP); LAMP was a prior art and was not described in detail here. In this experiment, the plasmid of the E6-E7 gene of HPV16 was diluted ten-fold until 1 copy/μL. The primers shown in Table 4 were designed according to the DNA sequence of the gene E6-E7. The primer concentration was 1.6 μM for FIP/BIP, 0.2 μM for F3/B3 and 0.4 μM for Loop-F/Loop-B. The final concentration of the RHAU23-Bst reaction was 100 nM. The concentration of Bst 2.0 warm-start DNA polymerase (NEB) was 0.32 U/μL. The concentration of aptamers was 200 nM. Bst-LF and commercial Bst 2.0 warm-start DNA polymerase were used as controls. As shown in FIG. 7A, in the presence of Bst-LF, the amplification curve of the LAMP reaction showed no increase in fluorescence within 50 min, indicating that Bst-LF failed to detect the DNA sequence of HPV16. In contrast, referring to FIG. 7B and FIG. 7C, when the DNA/protein complex of DNA polymerase RHAU23-Bst and aptamer HG53-H7 was used in LAMP reaction, or the commercial Bst 2.0 warm-start DNA polymerase (warm-start shown in the figure) was used in LAMP reaction, typical amplification curves appeared sequentially according to the concentration of template DNA. Since the activity of RHAU23-Bst was limited by temperature control, the DNA/protein complex of DNA polymerase RHAU23-Bst and aptamer HG53-H7 could be left at room temperature for 8 hours without affecting the accuracy of subsequent LAMP reactions, as shown in FIG. 7B. In contrast, the amplification signal of the samples in the presence of Bst 2.0 warm-start DNA polymerase gradually decreased with increasing time at room temperature, and it took longer time to reach the plateau, as shown in FIG. 7C. Therefore, Bst 2.0 warm-start DNA polymerase could not effectively prevent primer depletion caused by non-specific amplification at low temperature, which was consistent with the results in FIG. 6B in Example 6.

TABLE 4

| Name | Sequence (5'-3') |
| --- | --- |
| FIP | CCGACCCCTTATATTATGGAATAT<br>GGTGTATTAACTGTCAAAAGCCA<br>(SEQ ID NO: 45) |
| BIP | CGGTCGATGTATGTCTTGTTGTTA<br>TGCAATGTAGGTGTATCTCCA<br>(SEQ ID NO: 46) |
| Loop-F | CTTTTTGTCCAGATGTCTTTGCT<br>(SEQ ID NO: 47) |
| Loop-B | CAAGAACACGTAGAGAAACCCAG<br>(SEQ ID NO: 48) |
| F3 | AGAGATGGGAATCCATATGCTG<br>(SEQ ID NO: 49) |
| B3 | ATCTATTTCATCCTCCTCCTCTG<br>(SEQ ID NO: 50) |

Example 8

Detection of SARS-CoV-2 RNA Using Warm-Start DNA Polymerase.

RT-LAMP: 5 U WarmStart RTx reverse transcriptase (NEB), 100 nM aptamer-based warm-start DNA polymerase and 0.5×gelgreen were added to a RT-LAMP reaction system. The modified DNA polymerase of warm-start DNA polymerase was RHAU23-Bst, the aptamer was HG53-H7, and the molar ratio of modified DNA polymerase to aptamer was 1:2. RT-LAMP was a prior art and was not described in detail here. In this experiment, the primers used were shown in Table 5. The primer concentration was 1.6 μM for FIP/BIP, 0.2 μM for F3/B3, and 0.4 μM for Loop-F/B. The amplification reaction was performed at 65° C. on a real-time PCR system of QuantStudio 7 Flex (Thermo Scientific)

pH mediated colorimetric RT-LAMP: 5 U WarmStart RTx Reverse Transcriptase (NEB), and 100 nM aptamer-based warm-start DNA polymerase were added in a RT-LAMP reaction system. The modified DNA polymerase of warm-start DNA polymerase was RHAU23-Bst, the aptamer was HG53-H7, and the molar ratio of modified DNA polymerase to aptamer was 1:2. Reactions were carried out at 65° C. in a specified time and detected by the color change of cresol red.

Figure 8A:
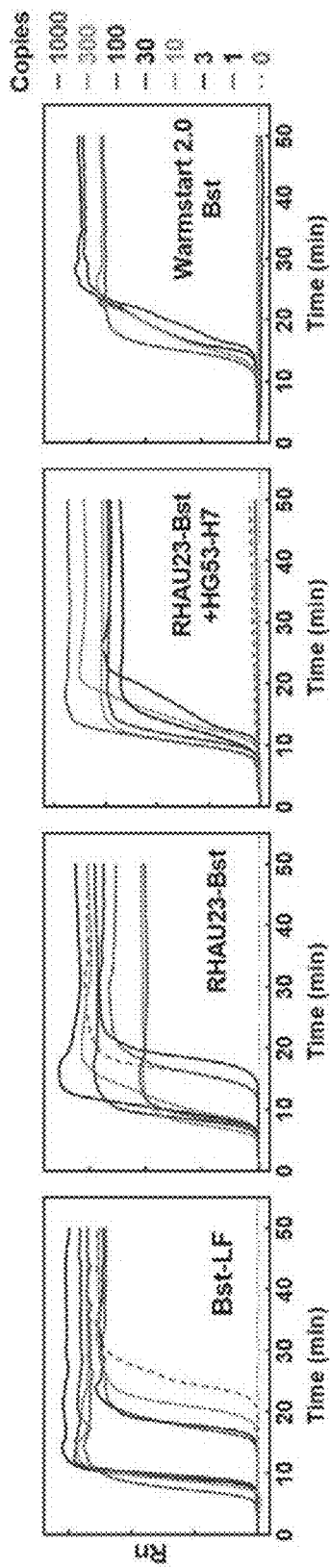
FIG. 8A is the RT-LAMP results of SARS-CoV-2 RNA.
Figure 8B:
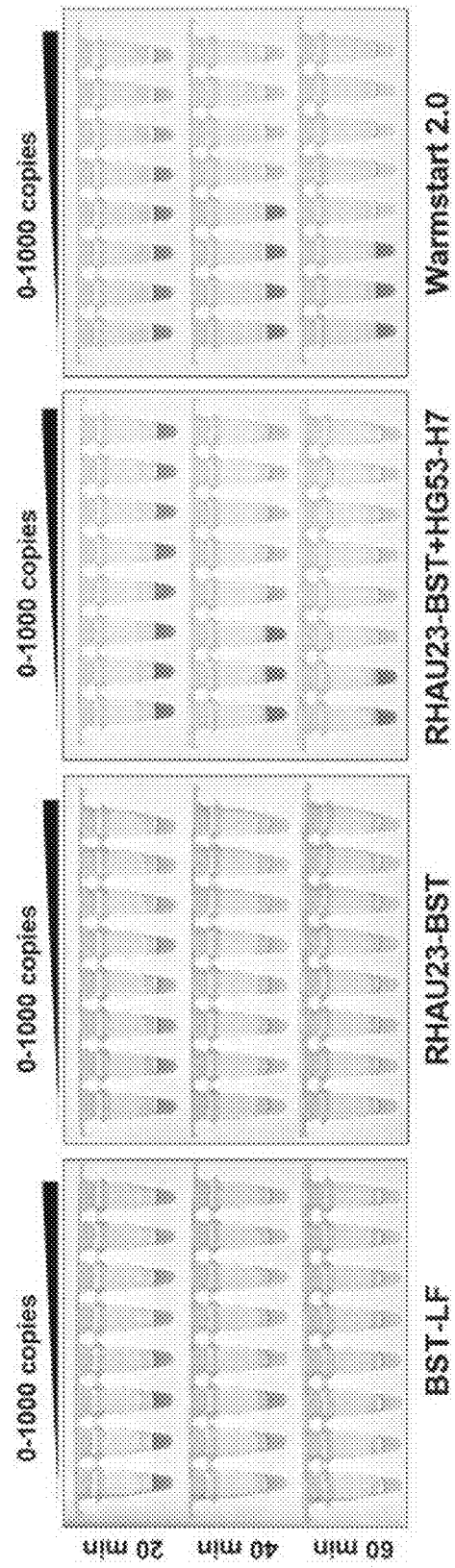
FIG. 8B is the result of pH-mediated colorimetric RT-LAMP result of SARS-CoV-2 RNA.

FIG. 8A showed the result of detecting SARS-CoV-2 pseudovirus RNA with a specified copy number using fluorescent RT-LAMP assay; FIG. 8B showed the result of detecting SARS-CoV-2 pseudovirus RNA using colorimetric RT-LAMP assay; the copy number of SARS-CoV-2 pseudoviral RNA was the same as that in the fluorescent RT-LAMP assay.

As shown in FIG. 8A, aptamer HG53-H7 in combination with RHAU23-Bst or the existing warm-start Bst DNA polymerase (WarmStart 2.0 Bst) could effectively prevent false positive results from non-specific amplification. As shown in FIG. 8B, the colorimetric RT-LAMP assay also showed the advantage of warm-start Bst DNA polymerase in preventing false positive results from non-specific amplification.

TABLE 5

| Name | Sequence (5'-3') |
|---|---|
| FIP | CCTTGAGGAAGTTGTAGCACGAAAA ATGAGGGAGCCTTGAATACACC (SEQ ID NO: 51) |
| BIP | TACGCAGAAGGGAGCAGAGGTTTTT TCTTGAACTGTTGCGACTACG (SEQ ID NO: 52) |
| Loop-F | GTTAGCAGGATTGCGGGTG (SEQ ID NO: 53) |
| Loop-B | AAGCCTCTTCTCGTTCCTCATC (SEQ ID NO: 54) |
| F3 | GCTGGACTTCCCTATGGTGC (SEQ ID NO: 55) |
| B3 | GCCATTGCCAGCCATTCTA (SEQ ID NO: 56) |

Example 9

The combination strategy of G-quadruplex binding peptide and aptamer containing G-quadruplex was suitable for Taq DNA polymerase.

Figure 9A:
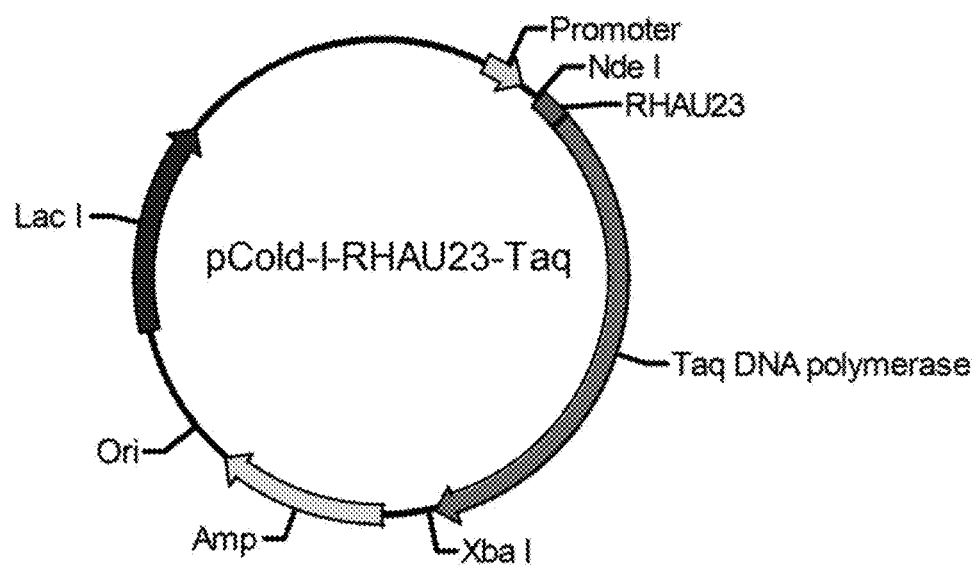
FIG. 9A is a pCold-I-RHAU23-Taq plasmid map provided by Example 9 of the disclosure.

The DNA polymerase RHAU23-Taq was constructed with reference to the method of Example 1. The sequence encoding the large fragment of Bst DNA polymerase in the plasmid pCold-I-RHAU23-Bst was replaced with the gene sequence encoding Taq DNA polymerase, to construct the plasmid pCold-I-RHAU23-Taq; the pCold-I-RHAU23-Taq plasmid profile was shown in FIG. 9A.

The activity of RHAU23-Taq was detected with reference to the method of Example 3. The final reaction concentration of RHAU23-Taq was 100 nM, and the final concentration of HG53-H7 was 200 nM. Primer extension was performed at different temperatures for 30 minutes by using the sample without aptamer as a control. The reaction buffer was the second buffer, containing 20 mM Tris-HCl (pH 8.8), 10 mM $(NH_4)_2SO_4$, 50 mM KCl, 2 mM $MgSO_4$, and 0.1% Tween-20.

Figure 9B:
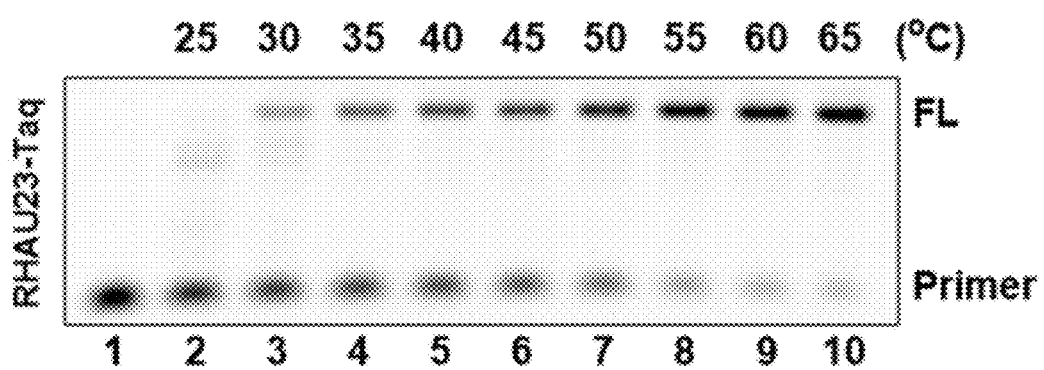
FIG. 9B is a diagram showing the results of primer extension assay of RHAU23-Taq at different temperatures in the absence of aptamer provided by Example 9 of the disclosure.
Figure 9C:
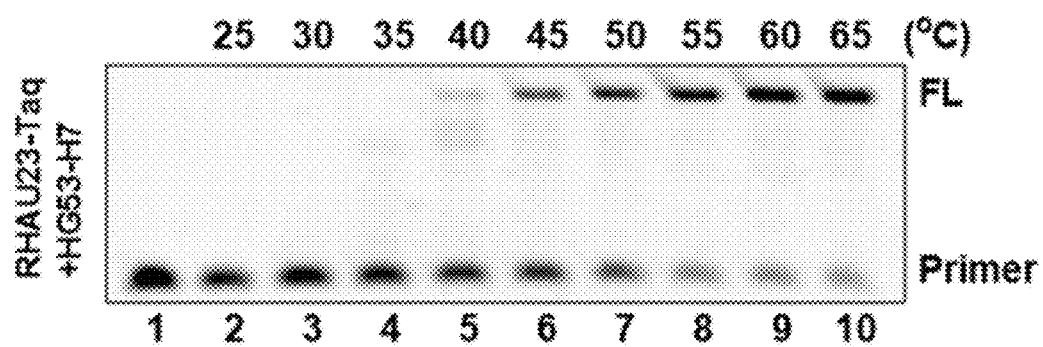
FIG. 9C is a diagram showing the results of primer extension assay of RHAU23-Taq at different temperatures in the presence of aptamer HG53-H7 provided by Example 9 of the disclosure.
Figure 9D:
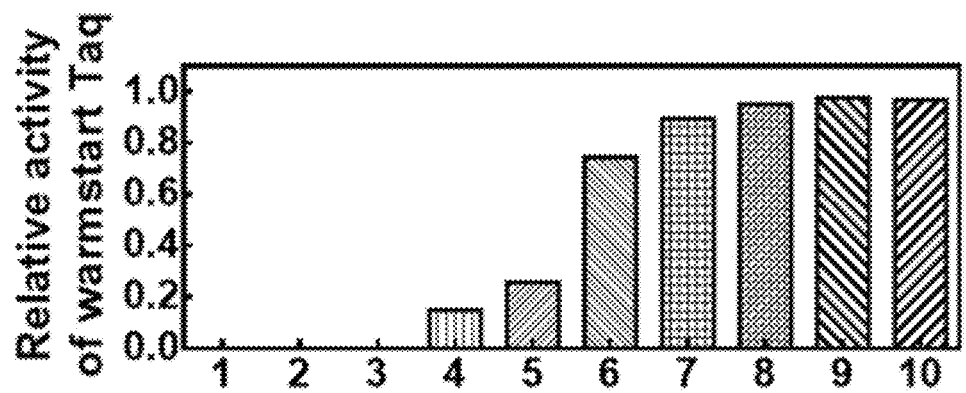
FIG. 9D shows the ratio of activity of RHAU23-Taq in the presence of aptamer HG53-H7 compared to the ratio in the absence of aptamer provided by Example 9 of the disclosure.

The relative activity of RHAU23-Taq was calculated by comparing the ratio of its full-length (indicated by FL in the figure) extension product to the full-length product of RHAU23-Taq at different temperatures after RHAU23-Taq bound to an aptamer containing G-quadruplex. As shown in FIG. 9B, RHAU23-Taq showed activity at 25° C.-65° C. As shown in FIGS. 9C and 9D, the activity of RHAU23-Taq was almost completely inhibited below 35° C. in the presence of 200 nM HG53-H7; the activity of RHAU23-Taq gradually recovered when the temperature was increased above 35° C., especially when the temperature was raised to above 50° C., the activity of RHAU23-Taq was almost completely recovered. Therefore, the binding strategy of G-quadruplex binding peptide and aptamer containing G-quadruplex was suitable for Taq DNA polymerase, and Taq DNA polymerase could be transformed into modified DNA polymerase to possess the warm-start ability.

It could be understood, in other examples, it was also possible to construct modified DNA polymerase G4P-Taq by constructing the plasmid pCold-I-G4P-Taq.

Example 10

The combination strategy of G-quadruplex binding peptide and aptamer containing G-quadruplex was suitable for reverse transcriptase.

Figure 10A:
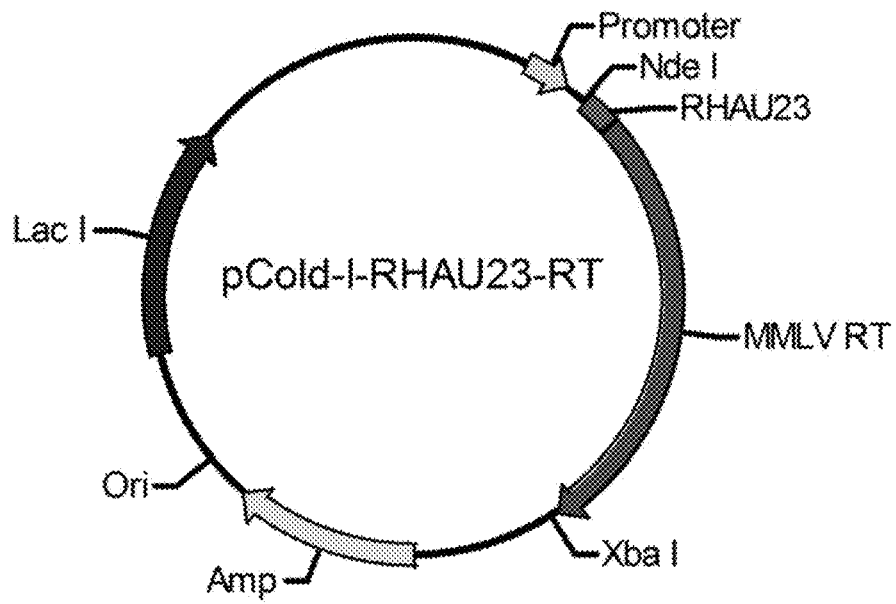
FIG. 10A is a pCold-I-RHAU23-RT plasmid map provided by Example 10 of the disclosure.

The reverse transcriptase RHAU23-RT was constructed with reference to the method of Example 1. The sequence encoding the large fragment of Bst in the plasmid pCold-I-RHAU23-Bst was replaced with the gene sequence encoding MMLV reverse transcriptase (RT), to construct the plasmid pCold-I-RHAU23-RT; the pCold-I-RHAU23-RT plasmid profile was shown in FIG. 10A.

A reverse transcription primer extension assay was performed according to the method of Example 3. The RNA was used as a template (the nucleotide sequence of the RNA template was shown in SEQ ID NO: 14), and the DNA paired with the RNA was used as a primer (the nucleotide sequence of the DNA primer was shown in SEQ ID NO: 15). The final reaction concentration was 100 nM for RHAU23-RT and 200 nM for HG53-H7. The reaction buffer was the second buffer, containing 20 mM Tris-HCl (pH 8.8), 10 mM $(NH_4)_2SO_4$, 50 mM KCl, 8 mM $MgSO_4$, and 0.1% Tween-20. Primer extension was performed at different temperatures for 15 minutes with the samples without fused G-quadruplex binding peptide and without added aptamer as controls.

Figure 10B:
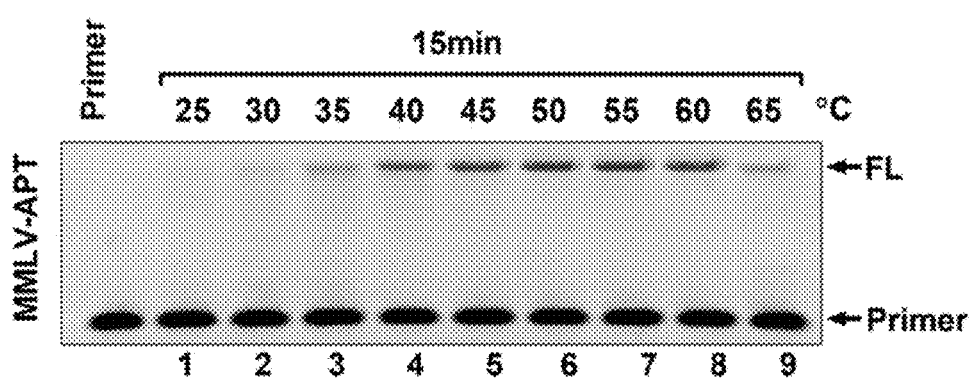
FIG. 10B is a diagram showing the results of primer extension assay of RHAU23-RT at different temperatures in the presence of aptamer HG53-H7 provided by Example 10 of the disclosure.
Figure 10C:
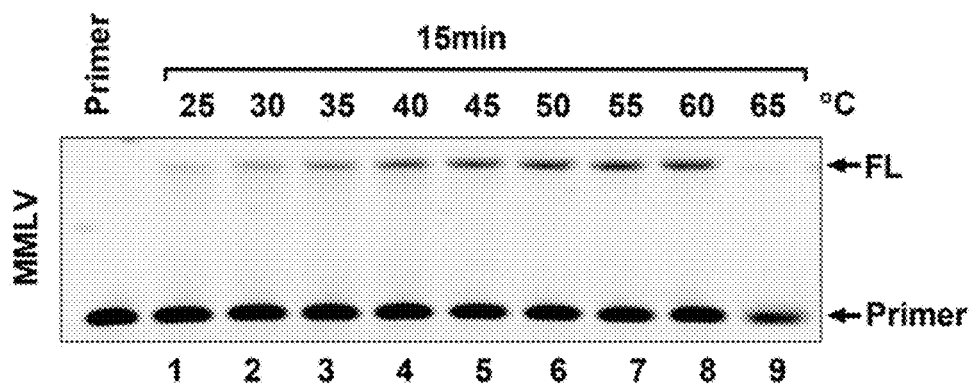
FIG. 10C is a diagram showing the results of primer extension assay of existing MMLV reverse transcriptase at different temperatures in the absence of aptamer provided by Example 10 of the disclosure.
Figure 10D:
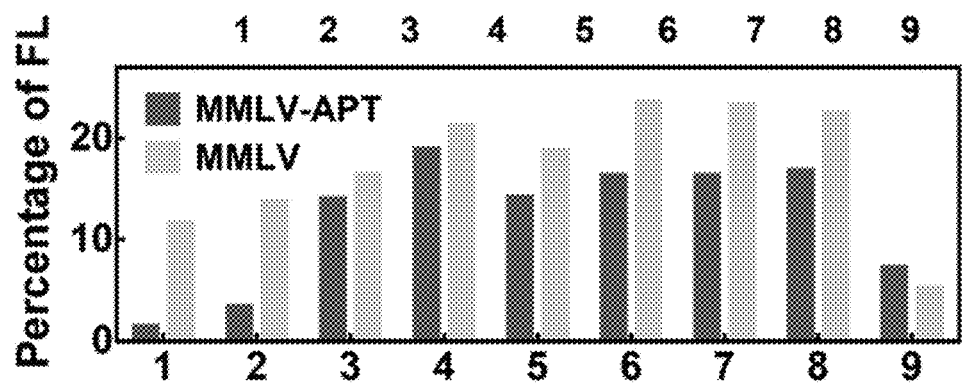
FIG. 10D shows the ratio of RHAU23-RT reverse transcriptase activity compared to the ratio of MMLV reverse transcriptase activity in the absence of aptamer provided by Example 10 of the disclosure.

Referring to FIG. 10C, existing MMLV reverse transcriptases had reverse transcriptase activity between 25° C.-65° C. referring to FIG. 10B and FIG. 10D, when the existing MMLV reverse transcriptase was modified using the binding strategy of G-quadruplex binding peptide and aptamer containing G-quadruplex, the activity of modified reverse transcriptase was strongly inhibited below 30° C. When the temperature rose to above 35° C., the activity of modified reverse transcription could be mostly recovered, especially when the temperature was between 50° C. and 60° C., the activity of modified reverse transcription could be better recovered after modification. Therefore, the binding strategy of G-quadruplex binding peptide and aptamer containing G-quadruplex was suitable for reverse transcriptase, which could be transformed into a modified reverse transcriptase with warm-start properties.

It could be understood, in other examples, it was also possible to construct reverse transcriptase G4P-RT by constructing the plasmid pCold-I-G4P-RT.

In conclusion, the binding strategy of G-quadruplex binding peptide and aptamer containing G-quadruplex was suitable for a variety of DNA polymerases, and DNA polymerases could be transformed into modified DNA polymerases with warm-start properties.

It will be obvious to those skilled in the art that changes and modifications may be made, and therefore, the aim in the appended claims is to cover all such changes and modifications.

What is claimed is:

1. A modified DNA polymerase, comprising a DNA polymerase fragment that maintains the DNA polymerase activity and a G-quadruplex binding peptide fused to the N-terminal of the DNA polymerase fragment.

2. The modified DNA polymerase of claim 1, wherein the G-quadruplex binding peptide comprises a RHAU23 peptide shown in SEQ ID NO: 1; or, the G-quadruplex binding peptide comprises a G4P peptide shown in SEQ ID NO: 2.

3. The modified DNA polymerase of claim 2, wherein the DNA polymerase fragment is resistant to temperatures above 40° C. and has activity at temperatures above 40° C.

4. The modified DNA polymerase of claim 3, wherein the DNA polymerase fragment is derived from any one of Bst DNA polymerase, Taq DNA polymerase and MMLV reverse transcriptase.

5. The modified DNA polymerase of claim 4, wherein the DNA polymerase fragment is derived from Bst DNA polymerase, and comprises an amino acid sequence shown in SEQ ID NO: 3.

6. The modified DNA polymerase of claim 4, wherein the DNA polymerase fragment is derived from Taq DNA polymerase, and comprises an amino acid sequence shown in SEQ ID NO: 4.

7. The modified DNA polymerase of claim 4, wherein the DNA polymerase fragment is derived from MMLV reverse transcriptase, and comprises an amino acid sequence shown in SEQ ID NO: 5.

8. A warm-start DNA polymerase, comprising the modified DNA polymerase of claim 1 and an aptamer comprising a G-quadruplex sequence; wherein the G-quadruplex of the aptamer binds to the G-quadruplex binding peptide of the modified DNA polymerase at a first preset temperature to inhibit the activity of the DNA polymerase, and detaches from the G-quadruplex binding peptide of the modified DNA polymerase at a second preset temperature to restore the activity of the DNA polymerase; and the second preset temperature is higher than the first preset temperature.

9. The warm-start DNA polymerase of claim 8, wherein the first preset temperature is 0° C.-30° C., and the second preset temperature is 45° C.-70° C.

10. A kit, comprising the warm-start DNA polymerase of claim 8.

11. The kit of claim 10, wherein the kit is used to detect human papilloma virus DNA or SARS virus RNA.

12. A method for biosynthesizing the modified DNA polymerase of claim 1, comprising:
    inserting a nucleotide sequence encoding the DNA polymerase fragment into a plasmid vector to construct a first plasmid;

inserting a nucleotide sequence encoding the G-quadruplex binding peptide into the first plasmid 5' to the nucleotide sequence encoding the DNA polymerase fragment so that the two nucleotide sequences are fused in frame, to construct a second plasmid;

transforming the second plasmid into an *E. coli* strain for culturing and inducing expression of a protein; and purifying the protein to obtain the modified DNA polymerase.

13. The method of claim 12, wherein the DNA polymerase fragment is derived from residues 291-878 of DNA polymerase of *Bacillus stearothermophilus*, the plasmid vector is pCold-I, and the first plasmid is pCold-I-Bst-LF plasmid; the G-quadruplex binding peptide is G4P, and the second plasmid is pCold-I-G4P-Bst plasmid; or, the G-quadruplex binding peptide is RHAU23, and the second plasmid is pCold-I-RHAU23-Bst plasmid.

14. The method of claim 12, wherein the DNA polymerase fragment is derived from Taq DNA polymerase, the plasmid vector is pCold-I, and the first plasmid is pCold-I-Taq plasmid; the G-quadruplex binding peptide is G4P, and the second plasmid is pCold-I-G4P-Taq plasmid; or, the G-quadruplex binding peptide is RHAU23, and the second plasmid is pCold-I-RHAU23-Taq plasmid.

15. The method of claim 12, wherein the DNA polymerase fragment is derived from MMLV reverse transcriptase, the plasmid vector is pCold-I, and the first plasmid is pCold-I-RT plasmid; the G-quadruplex binding peptide is G4P, and the second plasmid is pCold-I-G4P-RT plasmid; or, the G-quadruplex binding peptide is RHAU23, and the second plasmid is pCold-I-RHAU23-RT plasmid.

16. A method for preparing the warm-start DNA polymerase of claim 8, the method comprising:

dissolving the aptamer in a first buffer, denaturing at 90° C.-100° C. for 2 min to 8 min, cooling to 20° C.-30° C. to obtain a treated aptamer; and adding the modified DNA polymerase and the treated aptamer to a second buffer at a preset molar concentration ratio, and incubating at 2° C.-6° C. for 30 min to 60 min;

optionally wherein:

the first buffer comprises 10 mM Tris-HCl (pH 7.4), 75 mM KCl, 0.5 mM EDTA and 0.2 mg/ml bovine serum albumin, and the second buffer comprises 20 mM Tris-HCl (pH 8.8), 10 mM $(NH_4)_2SO_4$, 50 mM KCl, 2-8 mM $MgSO_4$, and 0.10% Tween-20.

17. The method of claim 16, wherein the preset molar concentration ratio of the modified DNA polymerase to the aptamer is between 1:8 and 1:1.

18. A method for detecting or synthesizing a nucleic acid comprising contacting the warm-start DNA polymerase of claim 8 with reagents required for detecting or synthesizing of the nucleic acid.

19. The method of claim 18, wherein the nucleic acid is a human papilloma virus DNA or SARS-COV-2 virus RNA.

* * * * *

```
                       SEQUENCE LISTING

<160> NUMBER OF SEQ ID NOS: 56

<210> SEQ ID NO 1
    <211> LENGTH: 23
    <212> TYPE: PRT
    <213> ORGANISM: Homo sapiens

<400> SEQUENCE: 1

His Pro Gly His Leu Lys Gly Arg Glu Ile Gly Met Trp Tyr Ala Lys
    1               5                   10                  15

Lys Gln Gly Gln Lys Asn Lys
                20

<210> SEQ ID NO 2
    <211> LENGTH: 64
    <212> TYPE: PRT
    <213> ORGANISM: Homo sapiens

<400> SEQUENCE: 2

His Pro Gly His Leu Lys Gly Arg Glu Ile Gly Met Trp Tyr Ala Lys
    1               5                   10                  15

Lys Gln Gly Gln Lys Asn Lys Gly Thr Gly Ser Gly Ala Gly Thr Gly
                20                  25                  30

Ser Gly Ala Gly Thr Gly Ser Gly Ala His Pro Gly His Leu Lys Gly
            35                  40                  45

Arg Glu Ile Gly Met Trp Tyr Ala Lys Lys Gln Gly Gln Lys Asn Lys
        50                  55                  60

<210> SEQ ID NO 3
    <211> LENGTH: 588
    <212> TYPE: PRT
    <213> ORGANISM: Geobacillus thermodenitrificans

<400> SEQUENCE: 3

Ala Ala Glu Gly Glu Lys Pro Leu Glu Glu Met Glu Phe Ala Ile Val
    1               5                   10                  15

Asp Val Ile Thr Glu Glu Met Leu Ala Asp Lys Ala Ala Leu Val Val
                20                  25                  30

Glu Val Met Glu Glu Asn Tyr His Asp Ala Pro Ile Val Gly Ile Ala
                35                  40                  45

Leu Val Asn Glu His Gly Arg Phe Phe Met Arg Pro Glu Thr Ala Leu
        50                  55                  60

Ala Asp Ser Gln Phe Leu Ala Trp Leu Ala Asp Glu Thr Lys Lys Lys
    65                  70                  75                  80
```

```
Ser Met Phe Asp Ala Lys Arg Ala Val Val Ala Leu Lys Trp Lys Gly
                85                  90                  95
Ile Glu Leu Arg Gly Val Ala Phe Asp Leu Leu Ala Ala Tyr Leu
            100                 105                 110
Leu Asn Pro Ala Gln Asp Ala Gly Asp Ile Ala Ala Val Ala Lys Met
            115                 120                 125
Lys Gln Tyr Glu Ala Val Arg Ser Asp Glu Ala Val Tyr Gly Lys Gly
            130                 135                 140
Ala Lys Arg Ser Leu Pro Asp Glu Gln Thr Leu Ala Glu His Leu Val
145                 150                 155                 160
Arg Lys Ala Ala Ala Ile Trp Ala Leu Glu Gln Pro Phe Met Asp Asp
                165                 170                 175
Leu Arg Asn Asn Glu Gln Asp Gln Leu Leu Thr Lys Leu Glu Gln Pro
            180                 185                 190
Leu Ala Ala Ile Leu Ala Glu Met Glu Phe Thr Gly Val Asn Val Asp
            195                 200                 205
Thr Lys Arg Leu Glu Gln Met Gly Ser Glu Leu Ala Glu Gln Leu Arg
            210                 215                 220
Ala Ile Glu Gln Arg Ile Tyr Glu Leu Ala Gly Gln Glu Phe Asn Ile
225                 230                 235                 240
Asn Ser Pro Lys Gln Leu Gly Val Ile Leu Phe Glu Lys Leu Gln Leu
                245                 250                 255
Pro Val Leu Lys Lys Thr Lys Thr Gly Tyr Ser Thr Ser Ala Asp Val
                260                 265                 270
Leu Glu Lys Leu Ala Pro His His Glu Ile Val Glu Asn Ile Leu His
            275                 280                 285
Tyr Arg Gln Leu Gly Lys Leu Gln Ser Thr Tyr Ile Glu Gly Leu Leu
            290                 295                 300
Lys Val Val Arg Pro Asp Thr Gly Lys Val His Thr Met Phe Asn Gln
305                 310                 315                 320
Ala Leu Thr Gln Thr Gly Arg Leu Ser Ser Ala Glu Pro Asn Leu Gln
                325                 330                 335
Asn Ile Pro Ile Arg Leu Glu Glu Gly Arg Lys Ile Arg Gln Ala Phe
                340                 345                 350
Val Pro Ser Glu Pro Asp Trp Leu Ile Phe Ala Ala Asp Tyr Ser Gln
                355                 360                 365
Ile Glu Leu Arg Val Leu Ala His Ile Ala Asp Asp Asn Leu Ile
            370                 375                 380
Glu Ala Phe Gln Arg Asp Leu Asp Ile His Thr Lys Thr Ala Met Asp
385                 390                 395                 400
Ile Phe His Val Ser Glu Glu Val Thr Ala Asn Met Arg Arg Gln
                405                 410                 415
Ala Lys Ala Val Asn Phe Gly Ile Val Tyr Gly Ile Ser Asp Tyr Gly
                420                 425                 430
Leu Ala Gln Asn Leu Asn Ile Thr Arg Lys Glu Ala Ala Glu Phe Ile
            435                 440                 445
Glu Arg Tyr Phe Ala Ser Phe Pro Gly Val Lys Gln Tyr Met Glu Asn
            450                 455                 460
Ile Val Gln Glu Ala Lys Gln Lys Gly Tyr Val Thr Thr Leu Leu His
465                 470                 475                 480
Arg Arg Arg Tyr Leu Pro Asp Ile Thr Ser Arg Asn Phe Asn Val Arg
                485                 490                 495
```

```
Ser Phe Ala Glu Arg Thr Ala Met Asn Thr Pro Ile Gln Gly Ser Ala
                500                 505                 510

Ala Asp Ile Ile Lys Lys Ala Met Ile Asp Leu Ala Ala Arg Leu Lys
            515                 520                 525

Glu Glu Gln Leu Gln Ala Arg Leu Leu Leu Gln Val His Asp Glu Leu
        530                 535                 540

Ile Leu Glu Ala Pro Lys Glu Ile Glu Arg Leu Cys Glu Leu Val
545                 550                 555                 560

Pro Glu Val Met Glu Gln Ala Val Thr Leu Arg Val Pro Leu Lys Val
                565                 570                 575

Asp Tyr His Tyr Gly Pro Thr Trp Tyr Asp Ala Lys
                580                 585

<210> SEQ ID NO 4
<211> LENGTH: 590
<212> TYPE: PRT
<213> ORGANISM: Thermus aquaticus

<400> SEQUENCE: 4

Ile Glu Gly Arg Ile Ser His His Pro Gly His Leu Lys Gly Arg Glu
1               5                   10                  15

Ile Gly Met Trp Tyr Ala Lys Lys Gln Gly Gln Lys Asn Lys Ala Lys
            20                  25                  30

Lys Trp Lys Trp Lys Ser Leu Leu His Glu Phe Gly Leu Leu Glu Ser
        35                  40                  45

Pro Lys Ala Leu Glu Glu Ala Pro Trp Pro Pro Glu Gly Ala Phe
    50                  55                  60

Val Gly Phe Val Leu Ser Arg Lys Glu Pro Met Trp Ala Asp Leu Leu
65                  70                  75                  80

Ala Leu Ala Ala Ala Arg Gly Gly Arg Val His Arg Ala Pro Glu Pro
                85                  90                  95

Tyr Lys Ala Leu Arg Asp Leu Lys Glu Ala Arg Gly Leu Leu Ala Lys
            100                 105                 110

Asp Leu Ser Val Leu Ala Leu Arg Glu Gly Leu Gly Leu Pro Pro Gly
        115                 120                 125

Asp Asp Pro Met Leu Leu Ala Tyr Leu Leu Asp Pro Ser Asn Thr Thr
    130                 135                 140

Pro Glu Gly Val Ala Arg Arg Tyr Gly Gly Glu Trp Thr Glu Glu Ala
145                 150                 155                 160

Gly Glu Arg Ala Ala Leu Ser Glu Arg Leu Phe Ala Asn Leu Trp Gly
                165                 170                 175

Arg Leu Glu Gly Glu Glu Arg Leu Leu Trp Leu Tyr Arg Glu Val Glu
            180                 185                 190

Arg Pro Leu Ser Ala Val Leu Ala His Met Glu Ala Thr Gly Val Arg
        195                 200                 205

Leu Asp Val Ala Tyr Leu Arg Ala Leu Ser Leu Glu Val Ala Glu Glu
    210                 215                 220

Ile Ala Arg Leu Glu Ala Glu Val Phe Arg Leu Ala Gly His Pro Phe
225                 230                 235                 240

Asn Leu Asn Ser Arg Asp Gln Leu Glu Arg Val Leu Phe Asp Glu Leu
                245                 250                 255

Gly Leu Pro Ala Ile Gly Lys Thr Glu Lys Thr Gly Lys Arg Ser Thr
            260                 265                 270

Ser Ala Ala Val Leu Glu Ala Leu Arg Glu Ala His Pro Ile Val Glu
        275                 280                 285
```

Lys Ile Leu Gln Tyr Arg Glu Leu Thr Lys Leu Lys Ser Thr Tyr Ile
             290                 295                 300

Asp Pro Leu Pro Asp Leu Ile His Pro Arg Thr Gly Arg Leu His Thr
305                 310                 315                 320

Arg Phe Asn Gln Thr Ala Thr Ala Thr Gly Arg Leu Ser Ser Ser Asp
                325                 330                 335

Pro Asn Leu Gln Asn Ile Pro Val Arg Thr Pro Leu Gly Gln Arg Ile
            340                 345                 350

Arg Arg Ala Phe Ile Ala Glu Glu Gly Trp Leu Leu Val Ala Leu Asp
        355                 360                 365

Tyr Ser Gln Ile Glu Leu Arg Val Leu Ala His Leu Ser Gly Asp Glu
    370                 375                 380

Asn Leu Ile Arg Val Phe Gln Glu Gly Arg Asp Ile His Thr Glu Thr
385                 390                 395                 400

Ala Ser Trp Met Phe Gly Val Pro Arg Glu Ala Val Asp Pro Leu Met
                405                 410                 415

Arg Arg Ala Ala Lys Thr Ile Asn Phe Gly Val Leu Tyr Gly Met Ser
            420                 425                 430

Ala His Arg Leu Ser Gln Glu Leu Ala Ile Pro Tyr Glu Glu Ala Gln
        435                 440                 445

Ala Phe Ile Glu Arg Tyr Phe Gln Ser Phe Pro Lys Val Arg Ala Trp
    450                 455                 460

Ile Glu Lys Thr Leu Glu Glu Gly Arg Arg Arg Gly Tyr Val Glu Thr
465                 470                 475                 480

Leu Phe Gly Arg Arg Arg Tyr Val Pro Asp Leu Glu Ala Arg Val Lys
                485                 490                 495

Ser Val Arg Glu Ala Ala Glu Arg Met Ala Phe Asn Met Pro Val Gln
            500                 505                 510

Gly Thr Ala Ala Asp Leu Met Lys Leu Ala Met Val Lys Leu Phe Pro
        515                 520                 525

Arg Leu Glu Glu Met Gly Ala Arg Met Leu Leu Gln Val His Asp Glu
    530                 535                 540

Leu Val Leu Glu Ala Pro Lys Glu Arg Ala Glu Ala Val Ala Arg Leu
545                 550                 555                 560

Ala Lys Glu Val Met Glu Gly Val Tyr Pro Leu Ala Val Pro Leu Glu
                565                 570                 575

Val Glu Val Gly Ile Gly Glu Asp Trp Leu Ser Ala Lys Glu
            580                 585                 590

<210> SEQ ID NO 5
<211> LENGTH: 680
<212> TYPE: PRT
<213> ORGANISM: Moloney Murine Leukemia Virus

<400> SEQUENCE: 5

Thr Leu Asn Ile Glu Asp Glu His Arg Leu His Glu Thr Ser Lys Glu
1               5                   10                  15

Pro Asp Val Ser Leu Gly Ser Thr Trp Leu Ser Asp Phe Pro Gln Ala
                20                  25                  30

Trp Ala Glu Thr Gly Gly Met Gly Leu Ala Val Arg Gln Ala Pro Leu
            35                  40                  45

Ile Ile Pro Leu Lys Ala Thr Ser Thr Pro Val Ser Ile Lys Gln Tyr
        50                  55                  60

Pro Met Ser Gln Glu Ala Arg Leu Gly Ile Lys Pro His Ile Gln Arg

```
        65                  70                  75                  80
Leu Leu Asp Gln Gly Ile Leu Val Pro Cys Gln Ser Pro Trp Asn Thr
                85                  90                  95
Pro Leu Leu Pro Val Lys Lys Pro Gly Thr Asn Asp Tyr Arg Pro Val
                100                 105                 110
Gln Asp Leu Arg Glu Val Asn Lys Arg Val Glu Asp Ile His Pro Thr
                115                 120                 125
Val Pro Asn Pro Tyr Asn Leu Leu Ser Gly Leu Pro Pro Ser His Gln
                130                 135                 140
Trp Tyr Thr Val Leu Asp Leu Lys Asp Ala Phe Phe Cys Leu Arg Leu
145                 150                 155                 160
His Pro Thr Ser Gln Pro Leu Phe Ala Phe Glu Trp Arg Asp Pro Glu
                165                 170                 175
Met Gly Ile Ser Gly Gln Leu Thr Trp Thr Arg Leu Pro Gln Gly Phe
                180                 185                 190
Lys Asn Ser Pro Thr Leu Phe Asp Glu Ala Leu His Arg Asp Leu Ala
                195                 200                 205
Asp Phe Arg Ile Gln His Pro Asp Leu Ile Leu Leu Gln Tyr Val Asp
                210                 215                 220
Asp Leu Leu Leu Ala Ala Thr Ser Glu Leu Asp Cys Gln Gln Gly Thr
225                 230                 235                 240
Arg Ala Leu Leu Gln Thr Leu Gly Asn Leu Gly Tyr Arg Ala Ser Ala
                245                 250                 255
Lys Lys Ala Gln Ile Cys Gln Lys Gln Val Lys Tyr Leu Gly Tyr Leu
                260                 265                 270
Leu Lys Glu Gly Gln Arg Trp Leu Thr Glu Ala Arg Lys Glu Thr Val
                275                 280                 285
Met Gly Gln Pro Thr Pro Lys Thr Pro Arg Gln Leu Arg Glu Phe Leu
                290                 295                 300
Gly Thr Ala Gly Phe Cys Arg Leu Trp Ile Pro Gly Phe Ala Glu Met
305                 310                 315                 320
Ala Ala Pro Leu Tyr Pro Leu Thr Lys Thr Gly Thr Leu Phe Asn Trp
                325                 330                 335
Gly Pro Asp Gln Gln Lys Ala Tyr Gln Glu Ile Lys Gln Ala Leu Leu
                340                 345                 350
Thr Ala Pro Ala Leu Gly Leu Pro Asp Leu Thr Lys Pro Phe Glu Leu
                355                 360                 365
Phe Val Asp Glu Lys Gln Gly Tyr Ala Lys Gly Val Leu Thr Gln Lys
                370                 375                 380
Leu Gly Pro Trp Arg Arg Pro Val Ala Tyr Leu Ser Lys Lys Leu Asp
385                 390                 395                 400
Pro Val Ala Ala Gly Trp Pro Pro Cys Leu Arg Met Val Ala Ala Ile
                405                 410                 415
Ala Val Leu Thr Lys Asp Ala Gly Lys Leu Thr Met Gly Gln Pro Leu
                420                 425                 430
Val Ile Leu Ala Pro His Ala Val Glu Ala Leu Val Lys Gln Pro Pro
                435                 440                 445
Asp Arg Trp Leu Ser Asn Ala Arg Met Thr His Tyr Gln Ala Leu Leu
                450                 455                 460
Leu Asp Thr Asp Arg Val Gln Phe Gly Pro Val Val Ala Leu Asn Pro
465                 470                 475                 480
Ala Thr Leu Leu Pro Leu Pro Glu Glu Gly Leu Gln His Asn Cys Leu
                485                 490                 495
```

```
Asp Ile Leu Ala Glu Ala His Gly Thr Arg Pro Asp Leu Thr Asp Gln
                500                 505                 510

Pro Leu Pro Asp Ala Asp His Thr Trp Tyr Thr Asn Gly Ser Ser Leu
            515                 520                 525

Leu Gln Glu Gly Gln Arg Lys Ala Gly Ala Ala Val Thr Thr Glu Thr
        530                 535                 540

Glu Val Ile Trp Ala Lys Ala Leu Pro Ala Gly Thr Ser Ala Gln Arg
545                 550                 555                 560

Ala Glu Leu Ile Ala Leu Thr Gln Ala Leu Lys Met Ala Glu Gly Lys
                565                 570                 575

Lys Leu Asn Val Tyr Thr Asp Ser Arg Tyr Ala Phe Ala Thr Ala His
            580                 585                 590

Ile His Gly Glu Ile Tyr Arg Arg Gly Leu Leu Thr Ser Glu Gly
        595                 600                 605

Lys Glu Ile Lys Asn Lys Asp Glu Ile Leu Ala Leu Leu Lys Ala Leu
610                 615                 620

Phe Leu Pro Lys Arg Leu Ser Ile Ile His Cys Pro Gly His Gln Lys
625                 630                 635                 640

Gly His Ser Ala Glu Ala Arg Gly Asn Arg Met Ala Asp Gln Ala Ala
                645                 650                 655

Arg Lys Ala Ala Ile Thr Glu Thr Pro Asp Thr Ser Thr Leu Leu Ile
            660                 665                 670

Glu Asn Ser Ser Pro Tyr Thr Ser
        675                 680

<210> SEQ ID NO 6
<211> LENGTH: 21
<212> TYPE: DNA
<213> ORGANISM: Artificial Sequence
<220> FEATURE:
<223> OTHER INFORMATION: Fully synthetic

<400> SEQUENCE: 6
ggggcggggc gcggggcggg g                                           21

<210> SEQ ID NO 7
<211> LENGTH: 19
<212> TYPE: DNA
<213> ORGANISM: Artificial Sequence
<220> FEATURE:
<223> OTHER INFORMATION: Fully synthetic

<400> SEQUENCE: 7
gggcgggcgc gagggaggg                                              19

<210> SEQ ID NO 8
<211> LENGTH: 19
<212> TYPE: DNA
<213> ORGANISM: Artificial Sequence
<220> FEATURE:
<223> OTHER INFORMATION: Fully synthetic

<400> SEQUENCE: 8
gttttggtgg gtgggtggg                                              19

<210> SEQ ID NO 9
<211> LENGTH: 20
<212> TYPE: DNA
<213> ORGANISM: Artificial Sequence
<220> FEATURE:
```

```
<223> OTHER INFORMATION: Fully synthetic

<400> SEQUENCE: 9
gggagggcgg cggggcaggg                                                   20

<210> SEQ ID NO 10
<211> LENGTH: 16
<212> TYPE: DNA
<213> ORGANISM: Artificial Sequence
<220> FEATURE:
<223> OTHER INFORMATION: Fully synthetic

<400> SEQUENCE: 10
gtggtgggtg ggtggg                                                       16

<210> SEQ ID NO 11
<211> LENGTH: 14
<212> TYPE: DNA
<213> ORGANISM: Artificial Sequence
<220> FEATURE:
<223> OTHER INFORMATION: Fully synthetic

<400> SEQUENCE: 11
ggtgggtggg tggg                                                         14

<210> SEQ ID NO 12
<211> LENGTH: 14
<212> TYPE: DNA
<213> ORGANISM: Artificial Sequence
<220> FEATURE:
<223> OTHER INFORMATION: Fully synthetic

<400> SEQUENCE: 12
gggtggtggg tggg                                                         14

<210> SEQ ID NO 13
<211> LENGTH: 14
<212> TYPE: DNA
<213> ORGANISM: Artificial Sequence
<220> FEATURE:
<223> OTHER INFORMATION: Fully synthetic

<400> SEQUENCE: 13
ggttggtggg tggg                                                         14

<210> SEQ ID NO 14
<211> LENGTH: 507
<212> TYPE: RNA
<213> ORGANISM: Artificial Sequence
<220> FEATURE:
<223> OTHER INFORMATION: Fully synthetic

<400> SEQUENCE: 14
guguacuagu cgcggccgca auaaaauauc uuuauuuuca uuacaucugu guguugguuu        60
uuugugugaa ucgauaguac uaacauacgc ucuccaucaa aacaaaacga aacaaaacaa       120
acuagcaaaa uaggcugucc ccagugcaag ugcaggugcc agaacauuuc ucuaucgaua       180
gguaccgagc ucuuacgcgu gcuagcauag aguccacgaa ggaauuguga gcggauaaca       240
auucccagua acgaauucau agaugccgcu uuauguccc acccucccc acccuaggug         300 uaguagguca cagaucugga ugccaaucua gcugcucgau cccgcgaaau uaauacgacu       360
cacuauagga gagaggagag uugauuccua ccaugggcag cagccaucau caucaucauc       420
acagcagcgg ccugguugccg cgcggcagcc auauguucca ucuguuuucu uaucuguucu      480
```

| | |
|---|---|
| uucaucuguu cuuuuaucug uuuguuu | 507 |

<210> SEQ ID NO 15
<211> LENGTH: 26
<212> TYPE: DNA
<213> ORGANISM: Artificial Sequence
<220> FEATURE:
<223> OTHER INFORMATION: Fully synthetic

<400> SEQUENCE: 15

| | |
|---|---|
| atggtaggaa tcaactctcc tctctc | 26 |

<210> SEQ ID NO 16
<211> LENGTH: 69
<212> TYPE: DNA
<213> ORGANISM: Artificial Sequence
<220> FEATURE:
<223> OTHER INFORMATION: Fully synthetic

<400> SEQUENCE: 16

| | |
|---|---|
| cctgaagcag acagctagtg aattcgtttt ggtgggtggg tgggtacttg cgtataactg | 60 |
| ttccatagt | 69 |

<210> SEQ ID NO 17
<211> LENGTH: 71
<212> TYPE: DNA
<213> ORGANISM: Artificial Sequence
<220> FEATURE:
<223> OTHER INFORMATION: Fully synthetic

<400> SEQUENCE: 17

| | |
|---|---|
| ggacttcgtc tgtcgatcac ttaagttttt tttttttttt tttttatga acgcatattg | 60 |
| acaaggtatc a | 71 |

<210> SEQ ID NO 18
<211> LENGTH: 70
<212> TYPE: DNA
<213> ORGANISM: Artificial Sequence
<220> FEATURE:
<223> OTHER INFORMATION: Fully synthetic

<400> SEQUENCE: 18

| | |
|---|---|
| cctgaagcag acagctagtg aattcgggag ggcggcgggg cagggtactt gcgtataact | 60 |
| gttccatagt | 70 |

<210> SEQ ID NO 19
<211> LENGTH: 49
<212> TYPE: DNA
<213> ORGANISM: Artificial Sequence
<220> FEATURE:
<223> OTHER INFORMATION: Fully synthetic

<400> SEQUENCE: 19

| | |
|---|---|
| cagaccagaa gttttggtgg gtgggtggga ttttttttt actggtctg | 49 |

<210> SEQ ID NO 20
<211> LENGTH: 43
<212> TYPE: DNA
<213> ORGANISM: Artificial Sequence
<220> FEATURE:
<223> OTHER INFORMATION: Fully synthetic

<400> SEQUENCE: 20 aagtttggt gggtgggtgg gatcagacca gttttctggt ctg                  43

<210> SEQ ID NO 21
<211> LENGTH: 43
<212> TYPE: DNA
<213> ORGANISM: Artificial Sequence
<220> FEATURE:
<223> OTHER INFORMATION: Fully synthetic

<400> SEQUENCE: 21
cagaccagtt ttctggtctg aagttttggt gggtgggtgg gat                  43

<210> SEQ ID NO 22
<211> LENGTH: 71
<212> TYPE: DNA
<213> ORGANISM: Artificial Sequence
<220> FEATURE:
<223> OTHER INFORMATION: Fully synthetic

<400> SEQUENCE: 22
actatggaac agttatacgc aagtattttt tttttttttt tttttgaat tcactagctg     60 tctgcttcag g                                                    71

<210> SEQ ID NO 23
<211> LENGTH: 71
<212> TYPE: DNA
<213> ORGANISM: Artificial Sequence
<220> FEATURE:
<223> OTHER INFORMATION: Fully synthetic

<400> SEQUENCE: 23
tgataccttg tcaatatgcg ttcataaaaa aaaaaaaaaa aaaaaactta agtgatcgac     60
agacgaagtc c                                                    71

<210> SEQ ID NO 24
<211> LENGTH: 71
<212> TYPE: DNA
<213> ORGANISM: Artificial Sequence
<220> FEATURE:
<223> OTHER INFORMATION: Fully synthetic

<400> SEQUENCE: 24
actatggaac agttatacgc aagtattttt tttttttttt tttttgaat tcactagctg     60 tctgcttcag g                                                    71

<210> SEQ ID NO 25
<211> LENGTH: 47
<212> TYPE: DNA
<213> ORGANISM: Artificial Sequence
<220> FEATURE:
<223> OTHER INFORMATION: Fully synthetic

<400> SEQUENCE: 25
agaccagaag ttttggtggg tgggtgggat tttttttta ctggtct                  47

<210> SEQ ID NO 26
<211> LENGTH: 45
<212> TYPE: DNA
<213> ORGANISM: Artificial Sequence
<220> FEATURE:
<223> OTHER INFORMATION: Fully synthetic

<400> SEQUENCE: 26
gaccagaagt tttggtgggt gggtgggatt ttttttttac tggtc                   45

<210> SEQ ID NO 27
<211> LENGTH: 43
<212> TYPE: DNA
<213> ORGANISM: Artificial Sequence
<220> FEATURE:
<223> OTHER INFORMATION: Fully synthetic

<400> SEQUENCE: 27
accagaagtt ttggtgggtg ggtgggattt tttttttact ggt         43

<210> SEQ ID NO 28
<211> LENGTH: 41
<212> TYPE: DNA
<213> ORGANISM: Artificial Sequence
<220> FEATURE:
<223> OTHER INFORMATION: Fully synthetic

<400> SEQUENCE: 28
ccagaagttt tggtgggtgg gtgggatttt tttttactg g         41

<210> SEQ ID NO 29
<211> LENGTH: 41
<212> TYPE: DNA
<213> ORGANISM: Artificial Sequence
<220> FEATURE:
<223> OTHER INFORMATION: Fully synthetic

<400> SEQUENCE: 29
cagaccagaa gttttggtgg gtgggtggga ttactggtct g         41

<210> SEQ ID NO 30
<211> LENGTH: 43
<212> TYPE: DNA
<213> ORGANISM: Artificial Sequence
<220> FEATURE:
<223> OTHER INFORMATION: Fully synthetic

<400> SEQUENCE: 30
cagaccagaa gttttggtgg gtgggtggga ttttactggt ctg         43

<210> SEQ ID NO 31
<211> LENGTH: 45
<212> TYPE: DNA
<213> ORGANISM: Artificial Sequence
<220> FEATURE:
<223> OTHER INFORMATION: Fully synthetic

<400> SEQUENCE: 31
cagaccagaa gttttggtgg gtgggtggga ttttttactg gtctg         45

<210> SEQ ID NO 32
<211> LENGTH: 47
<212> TYPE: DNA
<213> ORGANISM: Artificial Sequence
<220> FEATURE:
<223> OTHER INFORMATION: Fully synthetic

<400> SEQUENCE: 32
cagaccagaa gttttggtgg gtgggtggga ttttttttac tggtctg         47

<210> SEQ ID NO 33
<211> LENGTH: 51
<212> TYPE: DNA
<213> ORGANISM: Artificial Sequence
<220> FEATURE:

<223> OTHER INFORMATION: Fully synthetic

<400> SEQUENCE: 33
cagaccagaa gttttggtgg gtgggtggga ttttttttt ttactggtct g        51

<210> SEQ ID NO 34
<211> LENGTH: 51
<212> TYPE: DNA
<213> ORGANISM: Artificial Sequence
<220> FEATURE:
<223> OTHER INFORMATION: Fully synthetic

<400> SEQUENCE: 34
cagaccagaa ggggcggggc gcgggcggg gatttttttt ttactggtct g        51

<210> SEQ ID NO 35
<211> LENGTH: 49
<212> TYPE: DNA
<213> ORGANISM: Artificial Sequence
<220> FEATURE:
<223> OTHER INFORMATION: Fully synthetic

<400> SEQUENCE: 35
cagaccagaa gggcgggcgc gagggaggga tttttttt actggtctg            49

<210> SEQ ID NO 36
<211> LENGTH: 50
<212> TYPE: DNA
<213> ORGANISM: Artificial Sequence
<220> FEATURE:
<223> OTHER INFORMATION: Fully synthetic

<400> SEQUENCE: 36
cagaccagaa gggagggcgg cggggcattg atttttttt tactggtctg          50

<210> SEQ ID NO 37
<211> LENGTH: 46
<212> TYPE: DNA
<213> ORGANISM: Artificial Sequence
<220> FEATURE:
<223> OTHER INFORMATION: Fully synthetic

<400> SEQUENCE: 37
cagaccagaa gtggtgggtg ggtgggattt tttttttact ggtctg             46

<210> SEQ ID NO 38
<211> LENGTH: 49
<212> TYPE: DNA
<213> ORGANISM: Artificial Sequence
<220> FEATURE:
<223> OTHER INFORMATION: Fully synthetic

<400> SEQUENCE: 38
cagaccagaa ttttggtgg gtgggtggga ttttttttt actggtctg            49

<210> SEQ ID NO 39
<211> LENGTH: 49
<212> TYPE: DNA
<213> ORGANISM: Artificial Sequence
<220> FEATURE:
<223> OTHER INFORMATION: Fully synthetic

<400> SEQUENCE: 39
cagaccagaa ttttgggtg gtgggtggga ttttttttt actggtctg            49

```
<210> SEQ ID NO 40
<211> LENGTH: 49
<212> TYPE: DNA
<213> ORGANISM: Artificial Sequence
<220> FEATURE:
<223> OTHER INFORMATION: Fully synthetic

<400> SEQUENCE: 40
cagaccagaa tttttggttg gtgggtggga ttttttttt actggtctg            49

<210> SEQ ID NO 41
<211> LENGTH: 30
<212> TYPE: DNA
<213> ORGANISM: Artificial Sequence
<220> FEATURE:
<223> OTHER INFORMATION: Fully synthetic

<400> SEQUENCE: 41
cagaccagaa atttttttt tactggtctg                                 30

<210> SEQ ID NO 42
<211> LENGTH: 49
<212> TYPE: DNA
<213> ORGANISM: Artificial Sequence
<220> FEATURE:
<223> OTHER INFORMATION: Fully synthetic

<400> SEQUENCE: 42
cagaccagaa gttttaataa ataaataaaa ttttttttt actggtctg            49

<210> SEQ ID NO 43
<211> LENGTH: 17
<212> TYPE: DNA
<213> ORGANISM: Artificial Sequence
<220> FEATURE:
<223> OTHER INFORMATION: Fully synthetic

<400> SEQUENCE: 43
ccagcctgcg gcgagtg                                              17

<210> SEQ ID NO 44
<211> LENGTH: 67
<212> TYPE: DNA
<213> ORGANISM: Artificial Sequence
<220> FEATURE:
<223> OTHER INFORMATION: Fully synthetic

<400> SEQUENCE: 44
tctattacat tctaagagtt agagttaggg tctactcttc ttctcttctt cactcgccgc   60
aggctgg                                                         67

<210> SEQ ID NO 45
<211> LENGTH: 47
<212> TYPE: DNA
<213> ORGANISM: Artificial Sequence
<220> FEATURE:
<223> OTHER INFORMATION: Fully synthetic

<400> SEQUENCE: 45
ccgacccctt atattatgga atatggtgta ttaactgtca aaagcca              47

<210> SEQ ID NO 46
<211> LENGTH: 45
<212> TYPE: DNA
<213> ORGANISM: Artificial Sequence
<220> FEATURE:
```

```
<223> OTHER INFORMATION: Fully synthetic

<400> SEQUENCE: 46
cggtcgatgt atgtcttgtt gttatgcaat gtaggtgtat ctcca          45

<210> SEQ ID NO 47
<211> LENGTH: 23
<212> TYPE: DNA
<213> ORGANISM: Artificial Sequence
<220> FEATURE:
<223> OTHER INFORMATION: Fully synthetic

<400> SEQUENCE: 47 cttttttgtcc agatgtctttt gct                                23

<210> SEQ ID NO 48
<211> LENGTH: 23
<212> TYPE: DNA
<213> ORGANISM: Artificial Sequence
<220> FEATURE:
<223> OTHER INFORMATION: Fully synthetic

<400> SEQUENCE: 48
caagaacacg tagagaaacc cag                                  23

<210> SEQ ID NO 49
<211> LENGTH: 22
<212> TYPE: DNA
<213> ORGANISM: Artificial Sequence
<220> FEATURE:
<223> OTHER INFORMATION: Fully synthetic

<400> SEQUENCE: 49
agagatggga atccatatgc tg                                   22

<210> SEQ ID NO 50
<211> LENGTH: 23
<212> TYPE: DNA
<213> ORGANISM: Artificial Sequence
<220> FEATURE:
<223> OTHER INFORMATION: Fully synthetic

<400> SEQUENCE: 50
atctatttca tcctcctcct ctg                                  23

<210> SEQ ID NO 51
<211> LENGTH: 47
<212> TYPE: DNA
<213> ORGANISM: Artificial Sequence
<220> FEATURE:
<223> OTHER INFORMATION: Fully synthetic

<400> SEQUENCE: 51
ccttgaggaa gttgtagcac gaaaaatgag ggagccttga atacacc        47

<210> SEQ ID NO 52
<211> LENGTH: 46
<212> TYPE: DNA
<213> ORGANISM: Artificial Sequence
<220> FEATURE:
<223> OTHER INFORMATION: Fully synthetic

<400> SEQUENCE: 52
tacgcagaag ggagcagagg tttttttcttg aactgttgcg actacg        46
```

```
<210> SEQ ID NO 53
<211> LENGTH: 19
<212> TYPE: DNA
<213> ORGANISM: Artificial Sequence
<220> FEATURE:
<223> OTHER INFORMATION: Fully synthetic

<400> SEQUENCE: 53
gttagcagga ttgcgggtg                                                    19

<210> SEQ ID NO 54
<211> LENGTH: 22
<212> TYPE: DNA
<213> ORGANISM: Artificial Sequence
<220> FEATURE:
<223> OTHER INFORMATION: Fully synthetic

<400> SEQUENCE: 54
aagcctcttc tcgttcctca tc                                                22

<210> SEQ ID NO 55
<211> LENGTH: 20
<212> TYPE: DNA
<213> ORGANISM: Artificial Sequence
<220> FEATURE:
<223> OTHER INFORMATION: Fully synthetic

<400> SEQUENCE: 55
gctggacttc cctatggtgc                                                   20

<210> SEQ ID NO 56
<211> LENGTH: 19
<212> TYPE: DNA
<213> ORGANISM: Artificial Sequence
<220> FEATURE:
<223> OTHER INFORMATION: Fully synthetic

<400> SEQUENCE: 56
gccattgcca gccattcta                                                    19
```